United States Patent
Giles et al.

(10) Patent No.: US 11,359,757 B2
(45) Date of Patent: Jun. 14, 2022

(54) COMBINATION PIPE SEAL AND GRIPS

(71) Applicant: Safe Isolations LLC, Houston, TX (US)

(72) Inventors: Paul Giles, Houston, TX (US); Humon Glenn Fardsalehi, Baton Rouge, LA (US)

(73) Assignee: SAFE ISOLATIONS LLC, Houston, TX (US)

( * ) Notice: Subject to any disclaimer, the term of this patent is extended or adjusted under 35 U.S.C. 154(b) by 0 days.

(21) Appl. No.: 17/390,650

(22) Filed: Jul. 30, 2021

(65) Prior Publication Data

US 2022/0107044 A1    Apr. 7, 2022

Related U.S. Application Data

(60) Provisional application No. 63/086,433, filed on Oct. 1, 2020.

(51) Int. Cl.
  *F16L 55/10*    (2006.01)
  *F16L 55/136*   (2006.01)
  *F16L 55/128*   (2006.01)

(52) U.S. Cl.
  CPC ......... *F16L 55/136* (2013.01); *F16L 55/1283* (2013.01)

(58) Field of Classification Search
  CPC .............................. F16L 55/136; F16L 55/1283
  USPC ......................................... 138/89, 90, 92, 94
  See application file for complete search history.

(56) References Cited

U.S. PATENT DOCUMENTS

| | | | |
|---|---|---|---|
| 679,393 A * | 7/1901 | McPherson | E21B 33/134 166/135 |
| 779,388 A * | 1/1905 | Barnes | E21B 33/134 166/135 |
| 1,794,662 A * | 3/1931 | Zerr | E21B 33/06 277/322 |
| 2,780,294 A | 2/1957 | Loomis | |
| 2,802,534 A | 8/1957 | Conrad | |
| 3,561,490 A | 2/1971 | Little | |
| 3,746,026 A | 7/1973 | Herring | |
| 4,465,104 A * | 8/1984 | Wittman | F16L 55/1283 138/89 |
| 4,991,651 A * | 2/1991 | Campbell | F16L 55/1283 138/89 |
| 5,924,454 A * | 7/1999 | Dyck | F16L 55/132 138/89 |
| 6,129,118 A * | 10/2000 | Friedrich | F16L 55/1283 138/89 |
| 7,841,364 B2 | 11/2010 | Yeazel et al. | |
| 7,866,347 B2 | 1/2011 | Bowie | |

(Continued)

OTHER PUBLICATIONS

International Search Report and Written Opinion issued in PCT App No. PCT/US21/044047, dated Nov. 15, 2021 (9 pages).

*Primary Examiner* — James F Hook
(74) *Attorney, Agent, or Firm* — Ewing & Jones, PLLC

(57) ABSTRACT

A pipeline plug includes a pressure head; a seal assembly; a seal expansion ring; a plurality of gripper bodies, a sliding gripper, and an actuator. Each gripper body is coupled to the seal expansion ring. Radial expansion of the gripper bodies supports radial expansion of the seal expansion ring. Additionally, radial expansion of the seal expansion ring supports radial expansion of the gripper bodies. The sliding gripper is slidingly coupled to a radially outer surface of the gripper body.

14 Claims, 30 Drawing Sheets

(56) References Cited

U.S. PATENT DOCUMENTS

| | | |
|---|---|---|
| 8,267,124 B2 | 9/2012 | Bowie |
| 8,307,856 B2 | 11/2012 | Yeazel et al. |
| 8,935,951 B2 | 1/2015 | Bowie |
| 9,027,602 B2 | 5/2015 | Bowie |
| 9,057,447 B2 | 6/2015 | Bowie |
| 9,169,956 B2 | 10/2015 | Bowie |
| 9,400,076 B2 | 7/2016 | Early et al. |
| 10,001,220 B2 | 6/2018 | Bowie |
| 10,436,372 B2 | 10/2019 | Bjorsvik et al. |
| 10,774,970 B2* | 9/2020 | Nguyen ............... E21B 33/1285 |
| 2005/0241710 A1* | 11/2005 | Early ................... F16L 55/1283 138/89 |
| 2010/0012330 A1 | 1/2010 | Ezell et al. |
| 2010/0032044 A1* | 2/2010 | Mellemstrand ....... F16L 55/132 138/89 |
| 2010/0051130 A1 | 3/2010 | Syse et al. |
| 2011/0278022 A1 | 11/2011 | Holstad |
| 2012/0055667 A1 | 3/2012 | Ingram et al. |
| 2014/0020782 A1* | 1/2014 | Early ................... F16L 55/136 138/89 |
| 2016/0376869 A1 | 12/2016 | Rochen et al. |
| 2019/0107239 A1* | 4/2019 | Bjorsvik ................ F16L 55/44 |

* cited by examiner

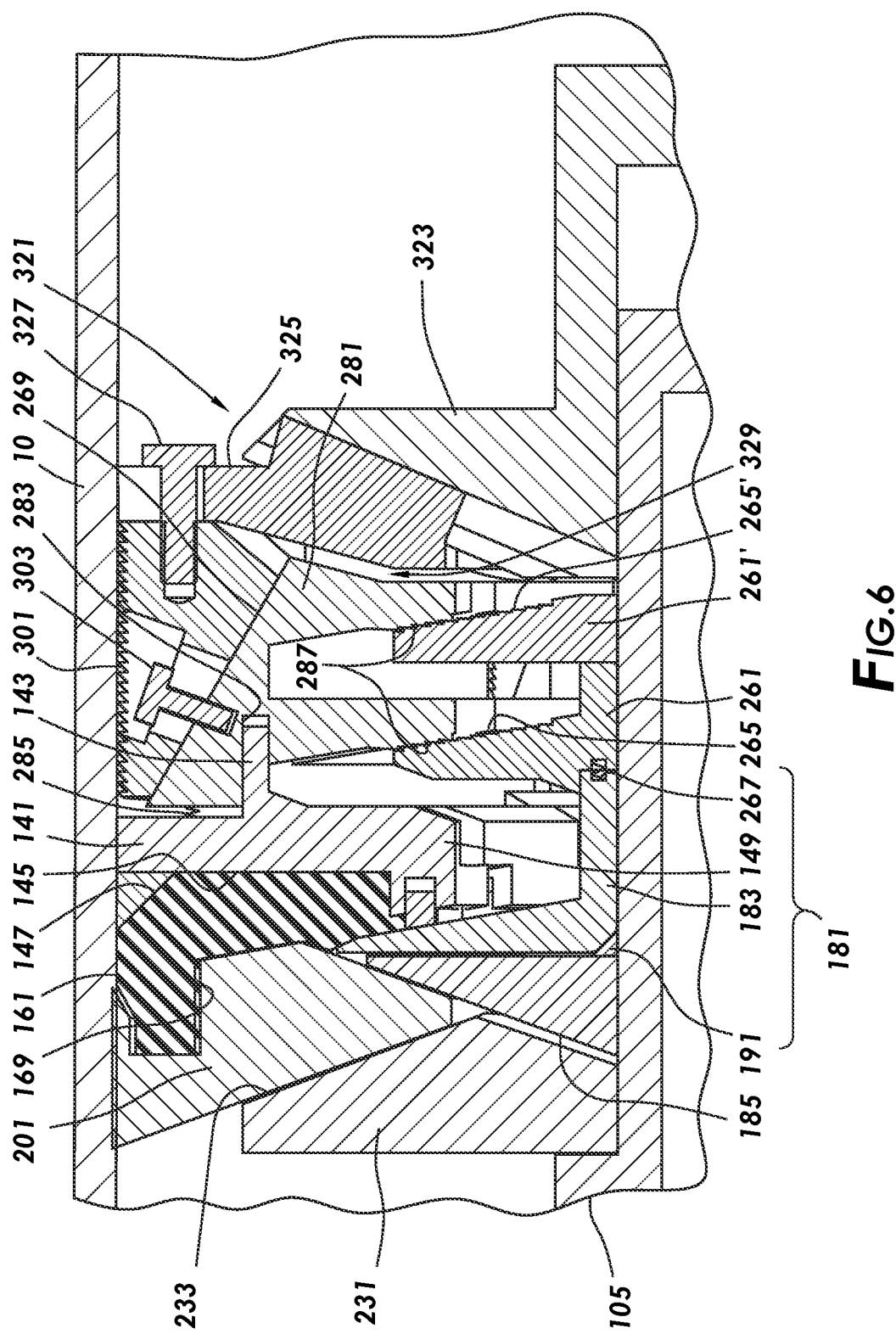

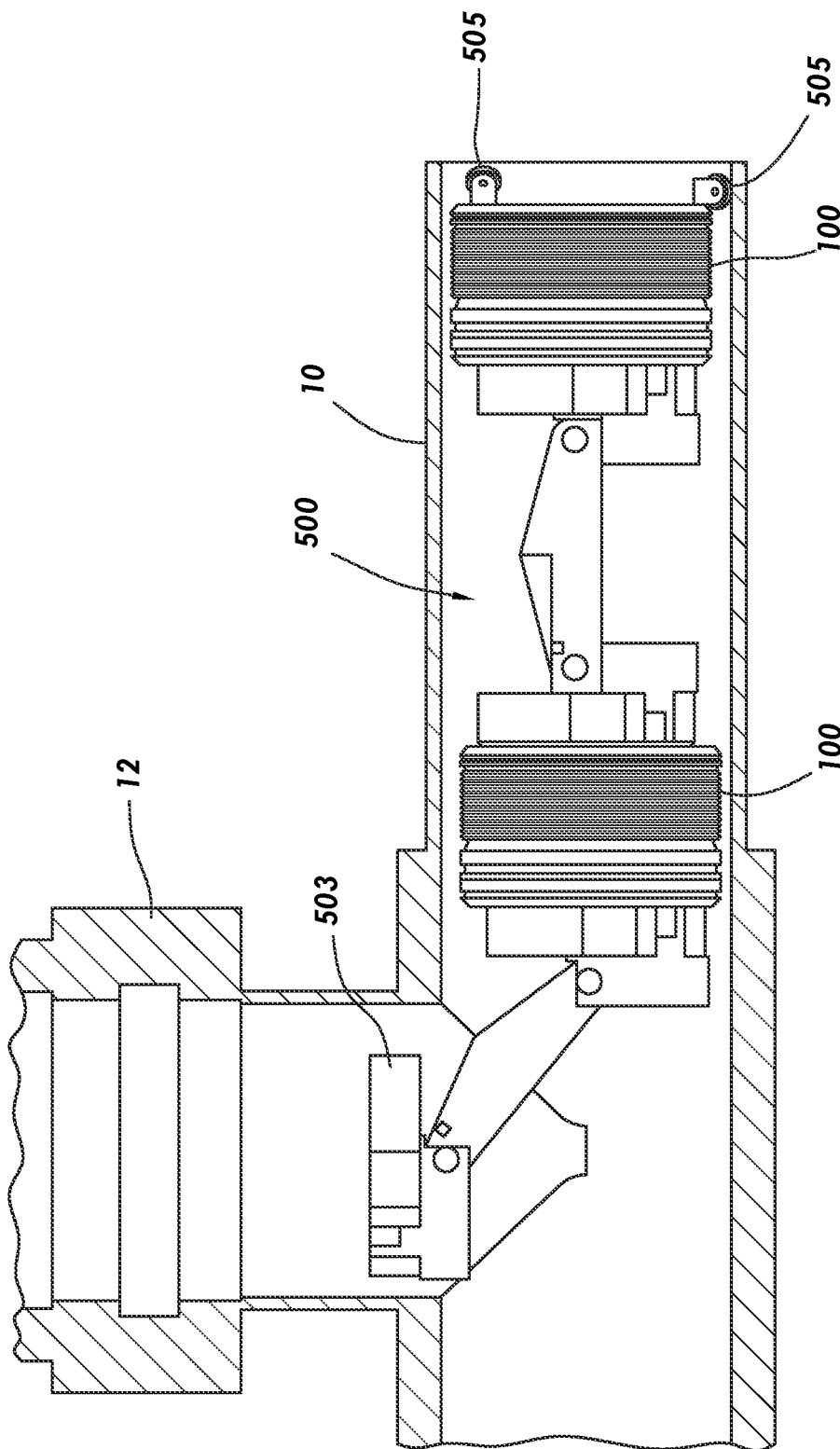

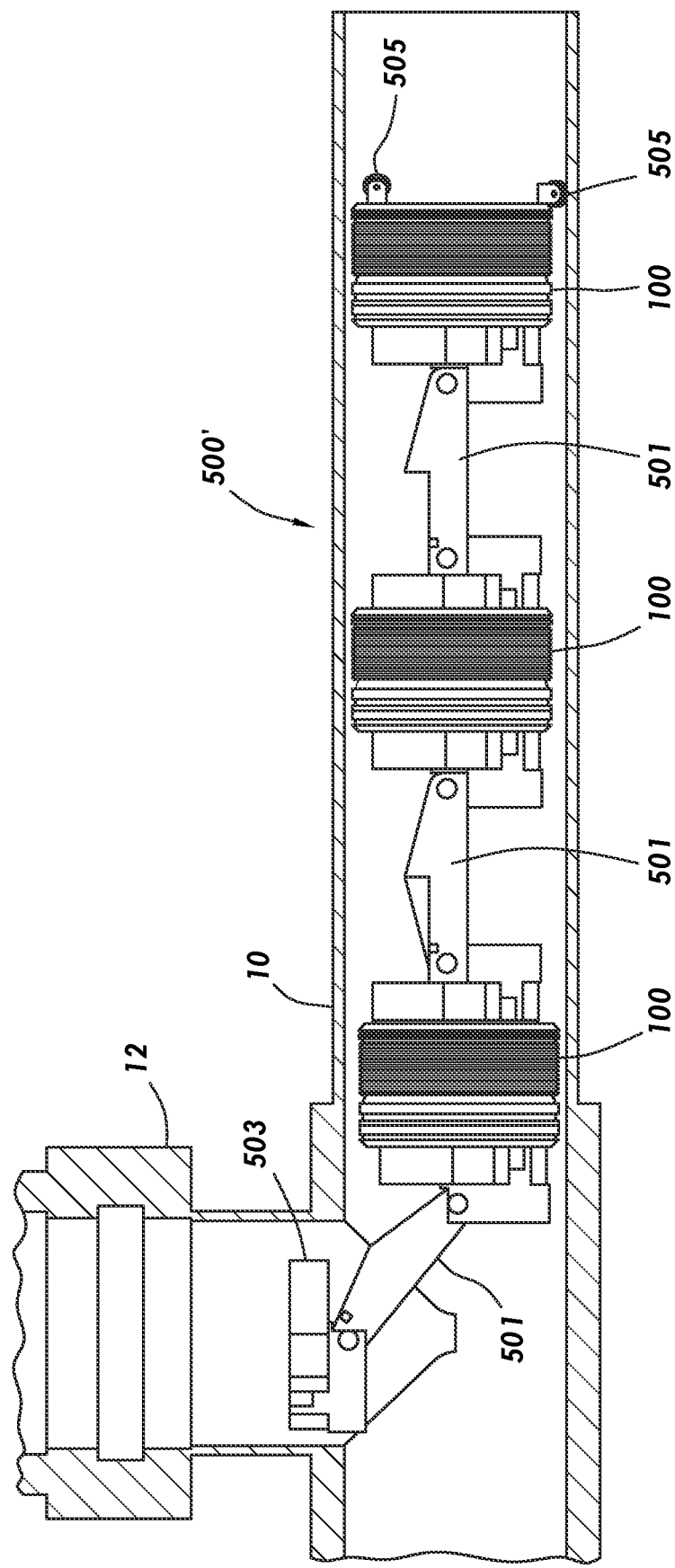

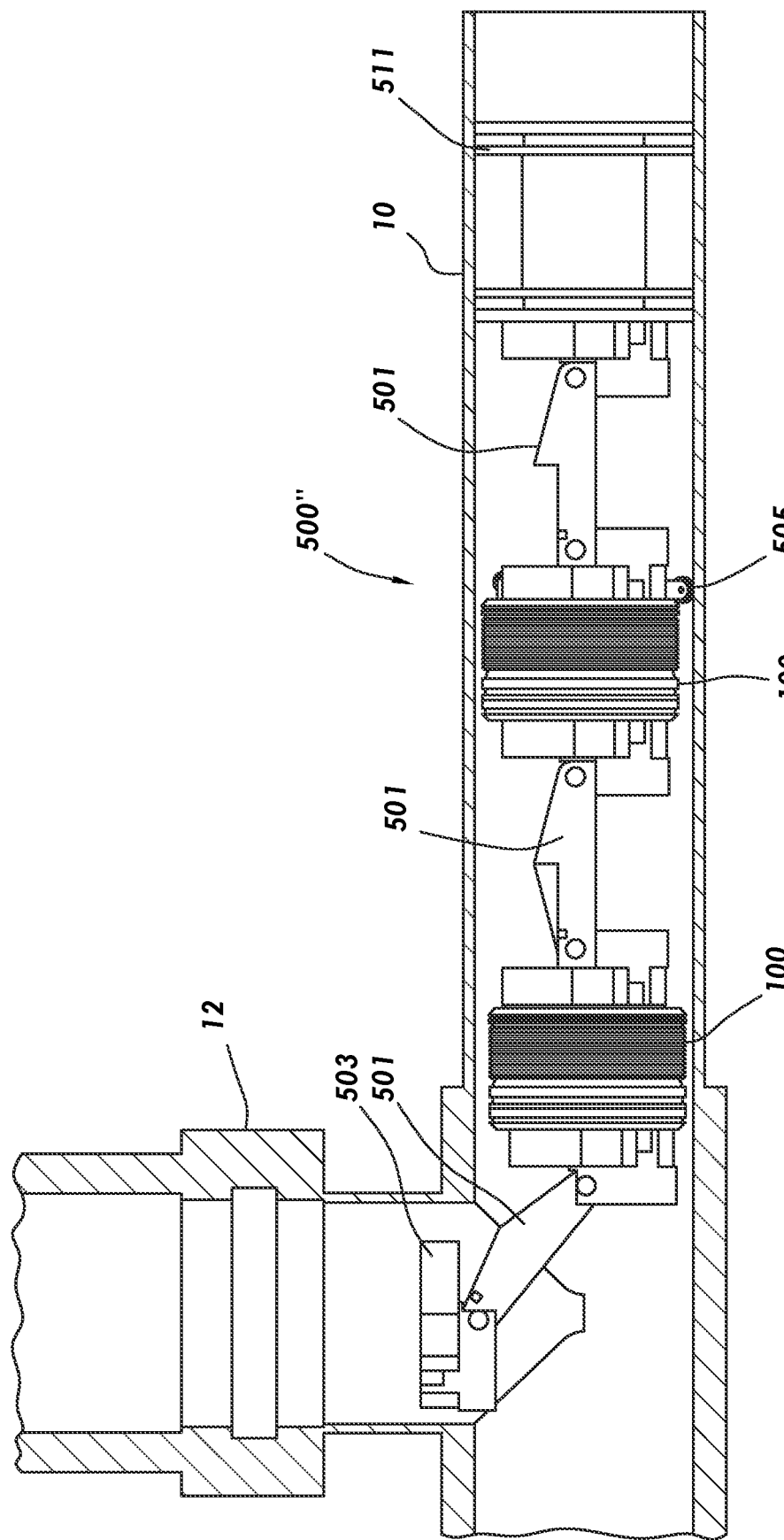

COMBINATION PIPE SEAL AND GRIPS

CROSS-REFERENCE TO RELATED APPLICATIONS

This application is a nonprovisional application which claims priority from U.S. provisional application No. 63/086,433, filed Oct. 1, 2020, which is incorporated by reference herein in its entirety.

TECHNICAL FIELD/FIELD OF THE DISCLOSURE

The present disclosure relates generally to pipeline tools and specifically to pipeline isolation tools.

BACKGROUND OF THE DISCLOSURE

Pipelines are used to transport liquids and gases over long distances. In some circumstances, a section of the pipeline needs to be isolated from pressure and fluids within the rest of the pipeline. For example, such isolation may be needed while undertaking planned maintenance or emergency repair of the pipeline or equipment associated with the pipeline such as valves. Additionally, such isolation may be needed while pressure testing certain sections of the pipeline.

When isolation of the pipeline is needed, one or more pipeline plugs may be introduced into the pipeline and moved to the desired isolation position. The pipeline plug may be introduced inline and moved through the pipeline to a desired position or may be introduced intrusively through an opened section of the pipeline. Once in position, the pipeline plug may be actuated such that plug fluidly isolates the section of the pipeline on one side of the pipeline plug from the section of the pipeline on the other side of the pipeline plug.

SUMMARY

The present disclosure provides for a pipeline plug. The pipeline plug may include a pressure head; a seal assembly; a seal expansion ring; a plurality of gripper bodies, each gripper body coupled to the seal expansion ring; a sliding gripper slidingly coupled to a radially outer surface of the gripper body; and an actuator.

The present disclosure also provides for an intrusive pipeline plug assembly. The intrusive pipeline plug assembly may include a pressure head; a seal assembly; a gripper assembly; and an actuator.

The present disclosure also provides for a method. The method may include positioning a pipeline plug within a pipeline, the pipeline plug including at least a gripper assembly and a seal assembly; actuating the gripper assembly; and supporting the seal assembly in a radially extended position with a gripper body of the gripper assembly.

The present disclosure also provides for a method. The method may include positioning a pipeline plug within a pipeline, the pipeline plug including at least a gripper assembly and a seal assembly, the gripper assembly being a two-stage gripper assembly; actuating the seal assembly; and actuating a first stage of the gripper assembly with the seal assembly.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 6 depicts a detail cross section view of the pipeline plug of FIG. 5 in an actuated position.

FIGS. 19, 20 depict cross sections of a pipeline during an intrusive isolation operation using a pipeline plug consistent with at least one embodiment of the present disclosure.

FIG. 21 depicts a cross section of a pipeline during an intrusive isolation operation using a pipeline plug consistent with at least one embodiment of the present disclosure.

FIG. 22 depicts a cross section of a pipeline during an intrusive isolation operation using a pipeline plug consistent with at least one embodiment of the present disclosure

DETAILED DESCRIPTION

Figure 1:
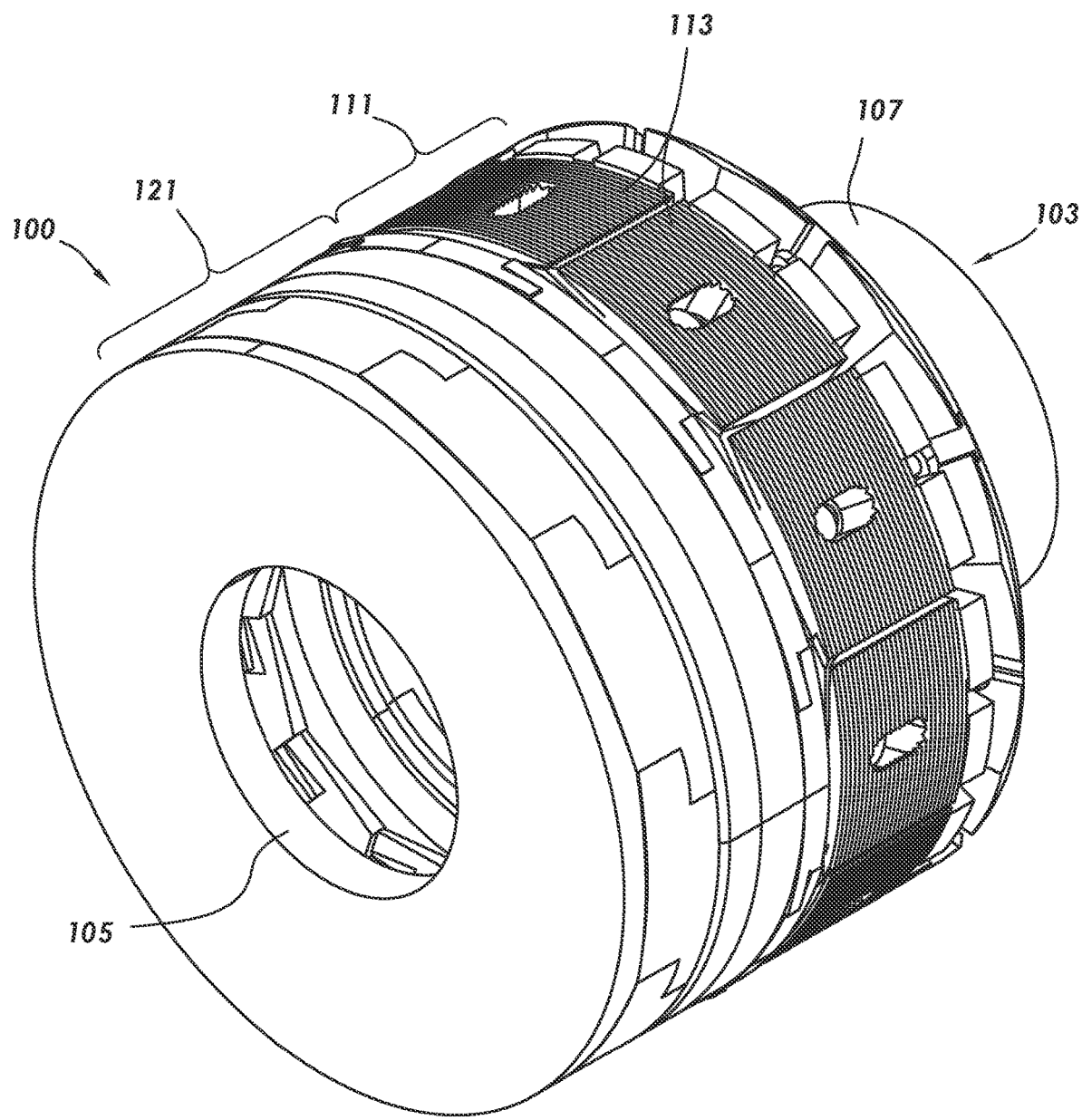
FIG. 1 depicts a perspective view of a pipeline plug consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
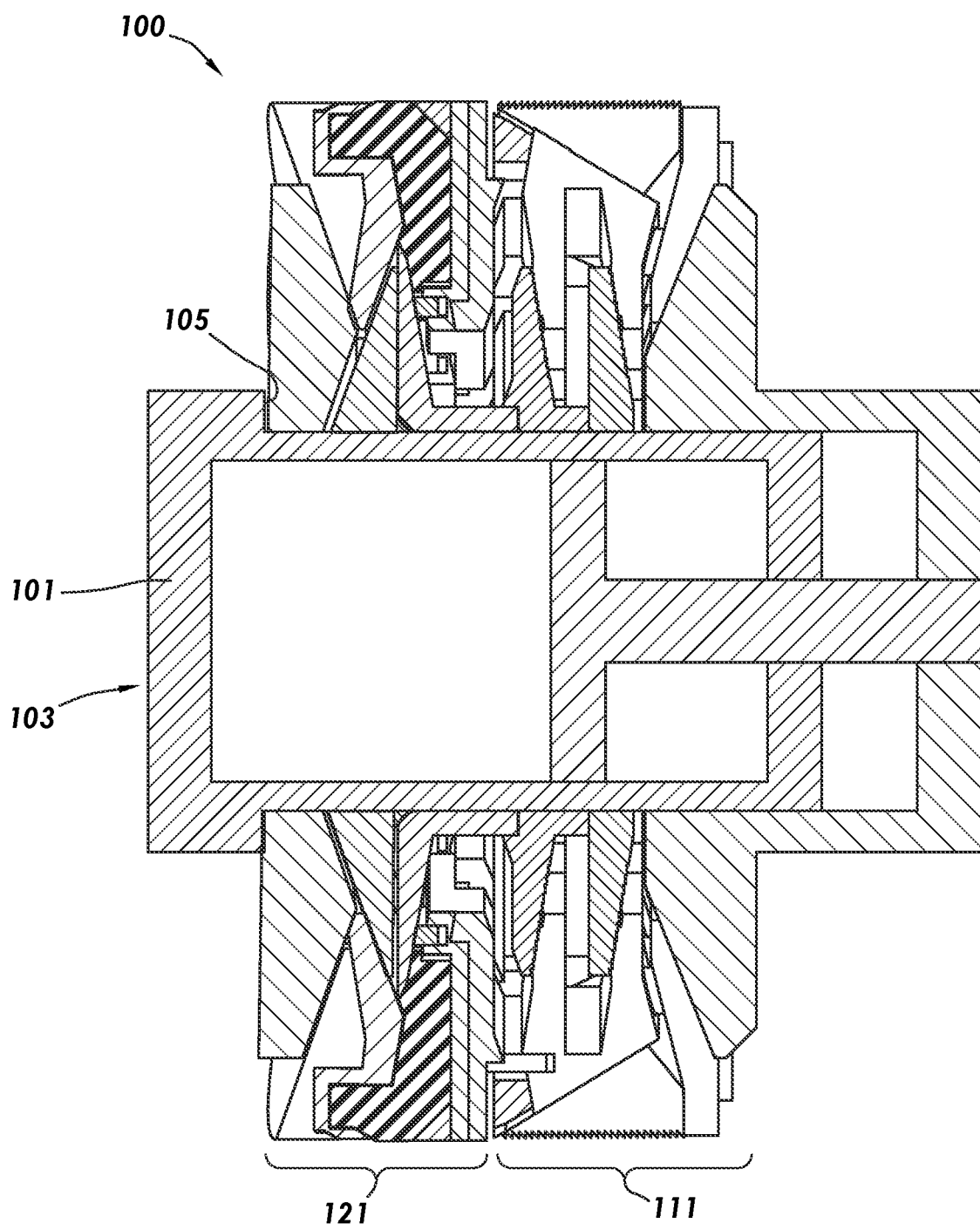
FIG. 2 depicts a cross section view of a pipeline plug including a seal assembly consistent with at least one embodiment of the present disclosure.

FIGS. 1 and 2 depict pipeline plug 100 consistent with at least one embodiment of the present disclosure. In some embodiments, pipeline plug 100 may include plug body 101. Plug body 101 may be generally tubular. In some embodiments, pipeline plug 100 may include actuation mechanism 103. Actuation mechanism 103 may include fixed head 105 and movable head 107. In some embodiments, fixed head 105 may be formed as part of or coupled to plug body 101. In some embodiments, movable head 107 may be movable relative to fixed head 105 by, for example and without limitation, hydraulic pressure, pneumatic pressure, or electromechanically. In some embodiments, actuation mechanism 103 may be at least partially positioned within plug body 101.

In some embodiments, pipeline plug 100 may include gripper assembly 111. Gripper assembly 111 may be annular or tubular in shape and may be positioned about plug body 101. Gripper assembly 111 may be used to maintain the position of pipeline plug 100 within a pipeline. Gripper assembly 111 may include one or more gripping elements 113 that extend radially outward into engagement with the pipeline when in an actuated position as discussed further herein below.

In some embodiments, pipeline plug 100 may include seal assembly 121. Seal assembly 121 may be annular or tubular and may be positioned about plug body 101. When actuated, seal assembly 121 may engage the pipeline such that seal assembly 121 fluidly isolates the section of the pipeline on one side of seal assembly 121 from the section of pipeline on the other side of seal assembly 121 as further described herein below.

In some embodiments, actuation mechanism 103 may be used to actuate seal assembly 121 and gripper assembly 111. In some embodiments, movement of movable head 107 may longitudinally compress seal assembly 121 and gripper assembly 111 as further described below.

Figure 3:
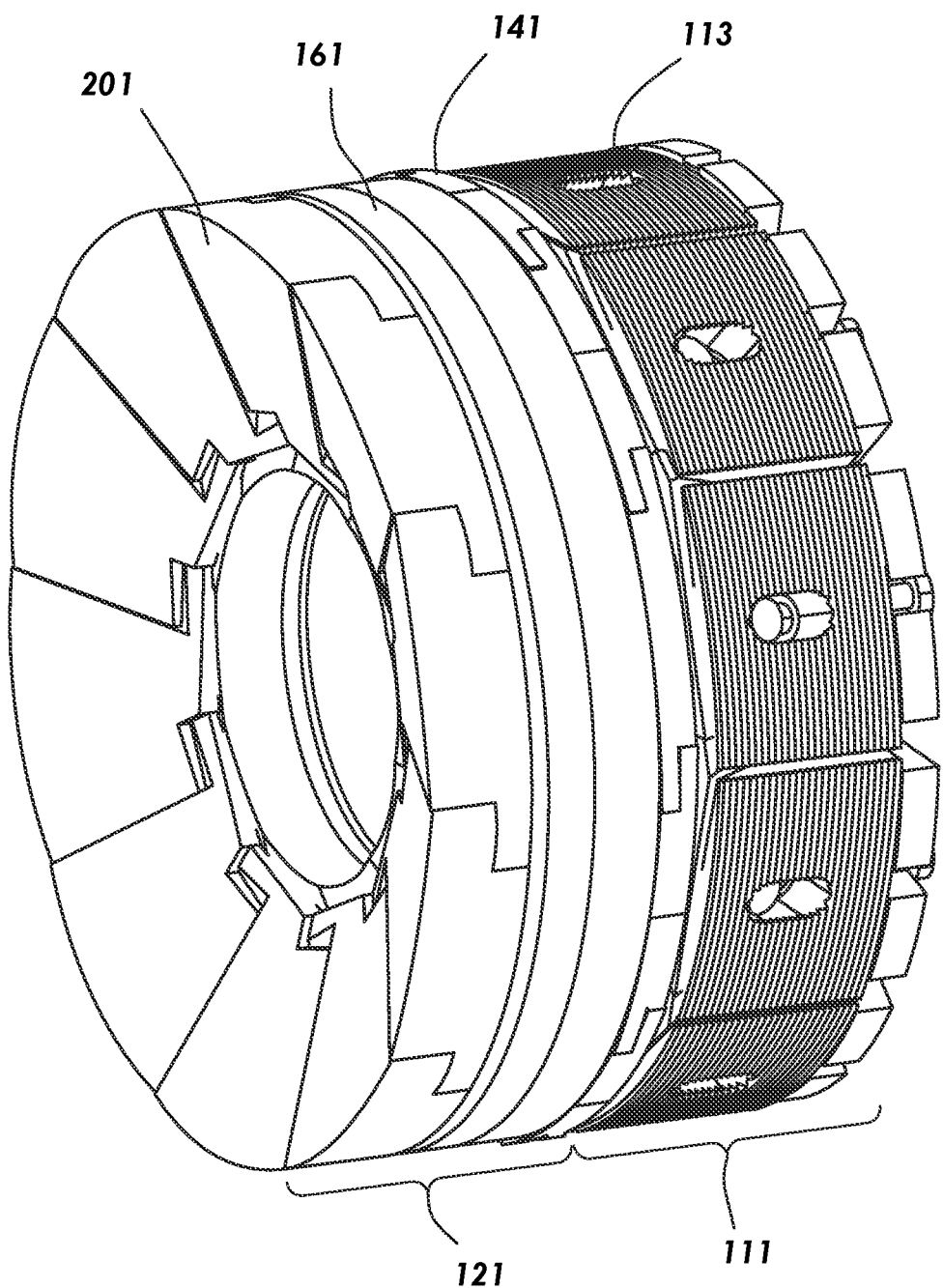
FIG. 3 depicts a perspective view of a seal and grip assembly consistent with at least one embodiment of the present disclosure.
Figure 4:
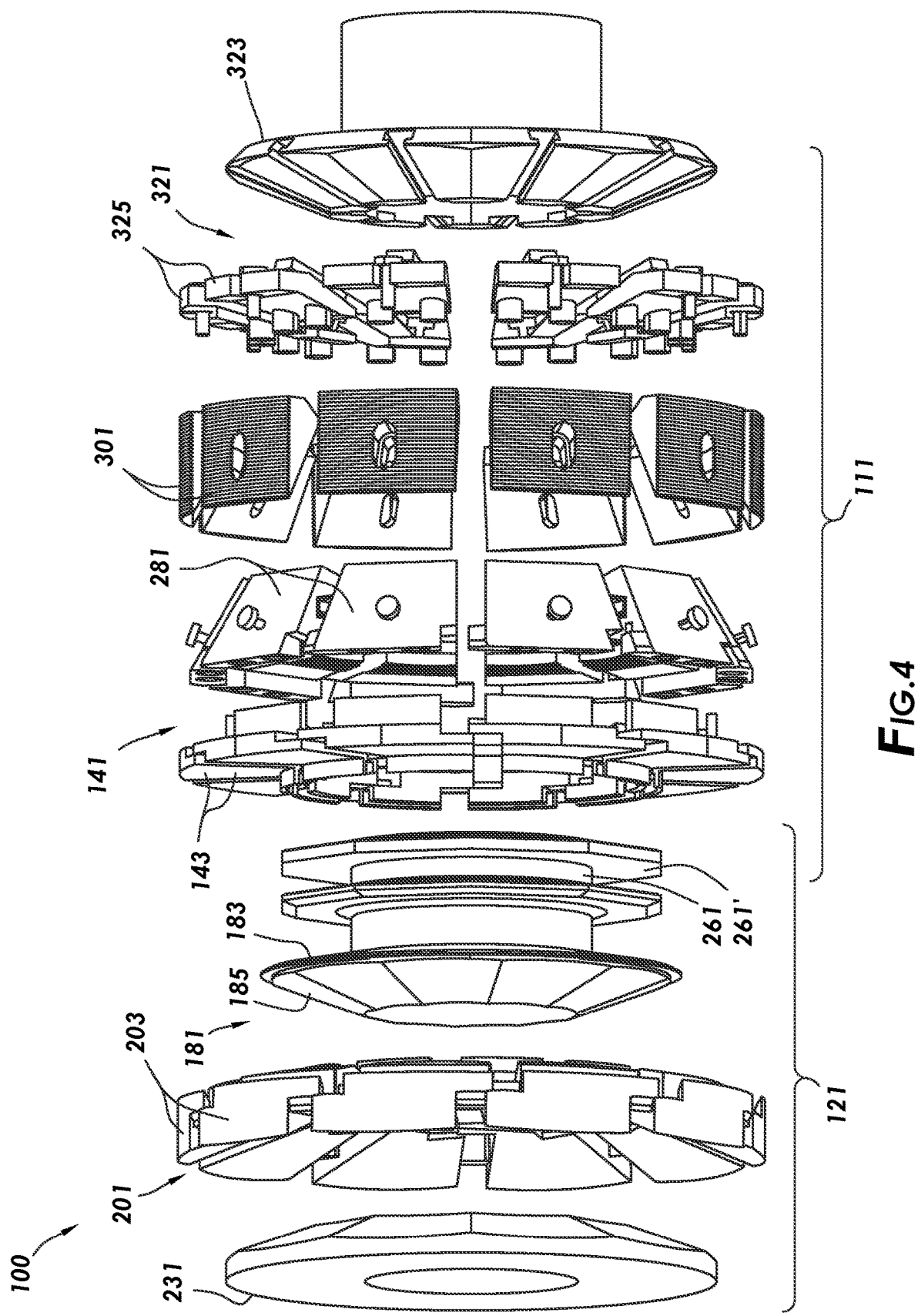
FIG. 4 depicts an exploded view of the seal and grip assembly of FIG. 3.
Figure 5:
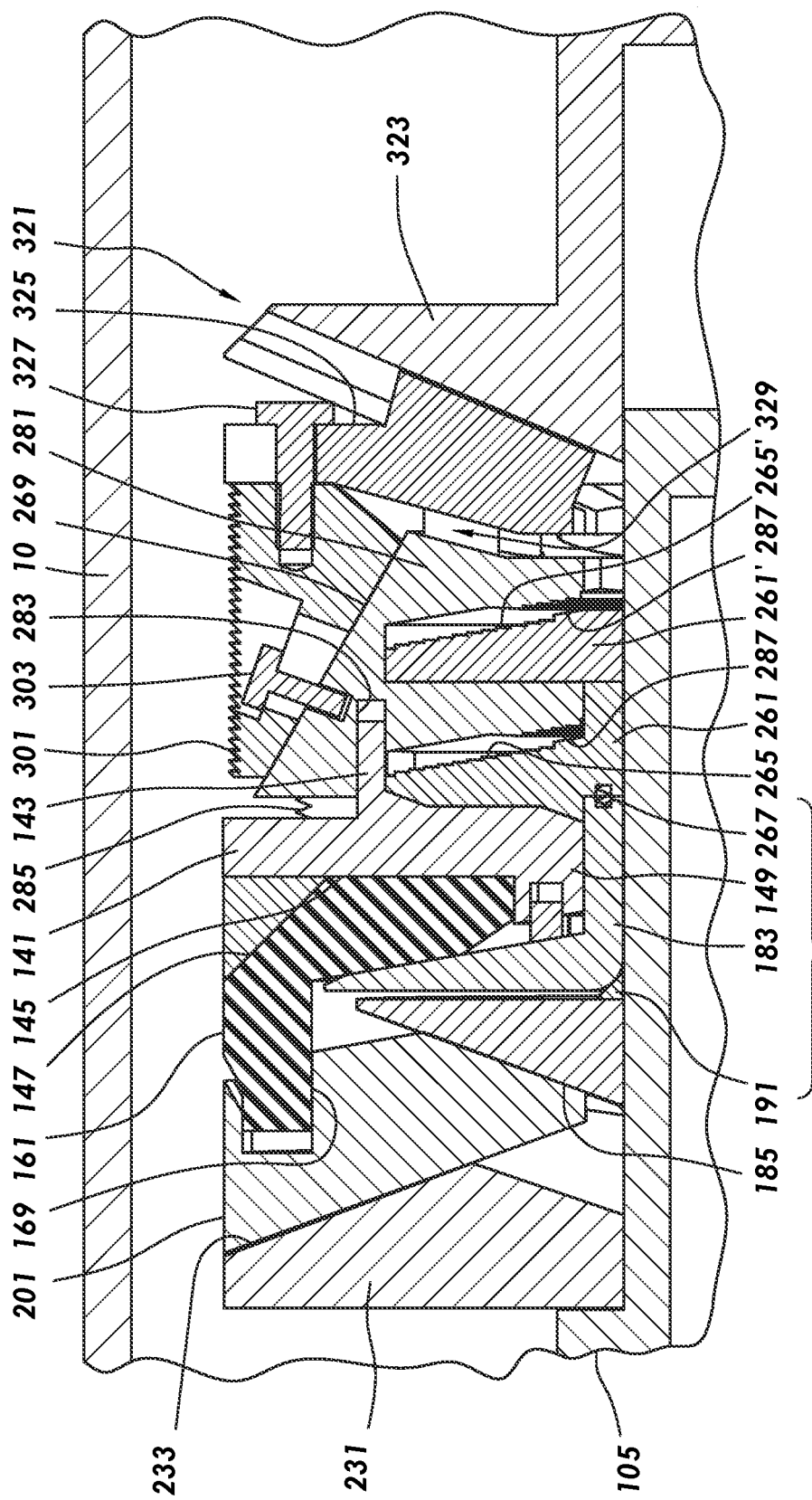
FIG. 5 depicts a detail cross section view of a pipeline plug consistent with at least one embodiment of the present disclosure in a run-in configuration.

FIGS. 3-5 depict gripper assembly 111 and seal assembly 121 consistent with at least one embodiment of the present disclosure. In some embodiments, seal assembly 121 may include seal expansion ring 141, primary seal ring 161, squeezer assembly 181, secondary tapered ring 201, and pressure head 231. In some embodiments, gripper assembly 111 may include inner locking body 261, gripper bodies 281, sliding grippers 301, and actuator assembly 321 as further described below. In some embodiments, each of seal expansion ring 141, primary seal ring 161, squeezer assembly 181, secondary tapered ring 201, pressure head 231, inner locking body 261, gripper bodies 281, sliding grippers 301, and actuator assembly 321 may be annular or tubular or may be arranged in an annular or tubular pattern and may be positioned about plug body 101. In some embodiments, seal expansion ring 141, primary seal ring 161, squeezer assembly 181, secondary tapered ring 201, pressure head 231 inner locking body 261, gripper bodies 281, sliding grippers 301, and actuator assembly 321 may be in abutment such that primary seal ring 161 and sliding grippers 301 are extended radially into contact with pipeline 10 (as shown in FIG. 6) when actuator assembly 321 is longitudinally biased toward pressure head 231 as further discussed below.

In some embodiments, as shown in FIGS. 6, when actuator assembly 321 is longitudinally biased toward pressure head 231, components of gripper assembly 111 and seal assembly 121 may be biased radially outward including, for example and without limitation, seal expansion ring 141, primary seal ring 161, secondary tapered ring 201, gripper bodies 281, sliding grippers 301, and components of actuator assembly 321. Primary seal ring 161 and sliding grippers 301 may engage pipeline 10. Such outward bias may be provided by, for example and without limitation, tapered interfaces formed at taper angles between pressure head 231 and secondary tapered ring 201, between secondary tapered ring 201 and squeezer assembly 181, and between components of actuator assembly 321 as further discussed below. For the purposes of this disclosure, two taper angles are considered to correspond if the two taper angles are, for example and without limitation, within 15°. By selecting the taper angle, the amount of radial movement of components of gripper assembly 111 and seal assembly 121 for a given longitudinal displacement of actuator assembly 321 relative to pressure head 231 may be determined. For example, the taper angle may be, for example and without limitation, between 1° and 45°, between 2° and 30°, or between 4° and 25°.

With respect to FIG. 5, seal expansion ring 141 may be annular and may be positioned about plug body 101. In certain embodiments, seal expansion ring 141 may include seal pocket 145. In some embodiments, seal pocket 145 may be defined as the location of seal expansion ring 141 against which primary seal ring 161 abuts. In some embodiments, seal pocket 145 may be a channel or groove in the face of seal expansion ring 141. In some embodiments, seal pocket 145 may be defined by seal lip 149. In some embodiments, seal pocket 145 may also be defined by a seal roof. The seal roof and/or seal lip 149 may be configured such that seal pocket 145 corresponds with the profile of primary seal ring 161 as shown in FIG. 5. In some embodiments, for example and without limitation, the seal roof may be configured to reduce extrusion of primary seal ring 161 as primary seal ring 161 is driven into engagement with a surrounding pipeline as further described below. In some embodiments, seal lip 149 may be configured such that radial expansion of seal expansion ring 141 may bias primary seal ring 161 into corresponding radial expansion and may reduce extrusion of primary seal ring 161 in a radially inward direction.

In some embodiments, seal expansion ring 141 may include expansion boss 143 formed in seal expansion ring 141 on the side opposite seal pocket 145. Expansion boss 143 may, in some embodiments, slidingly couple seal expansion ring 141 to gripper bodies 281 as further described below.

Figure 7:
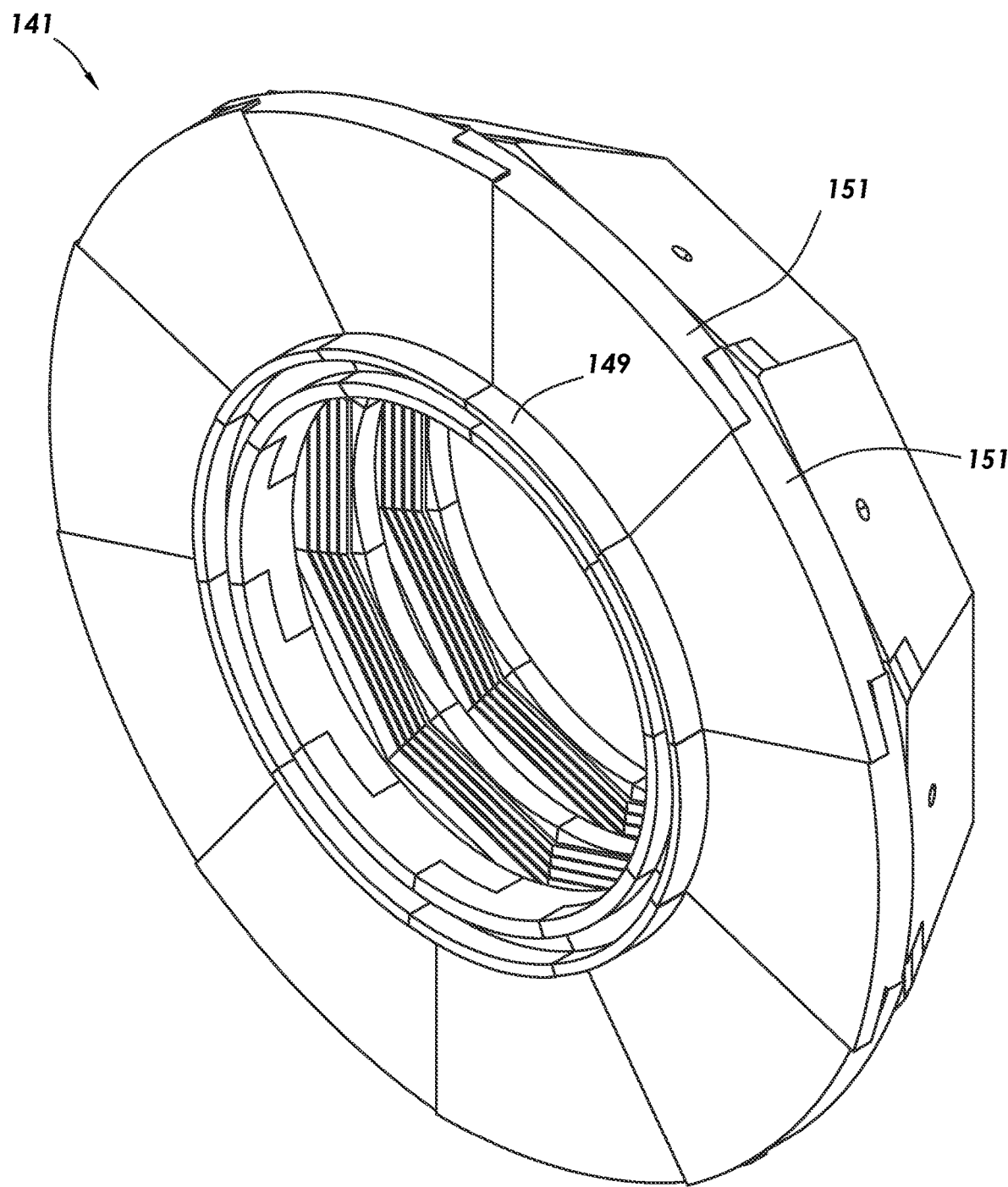
FIG. 7 depicts a perspective view of a seal expansion ring consistent with at least one embodiment of the present disclosure.
Figure 7A:
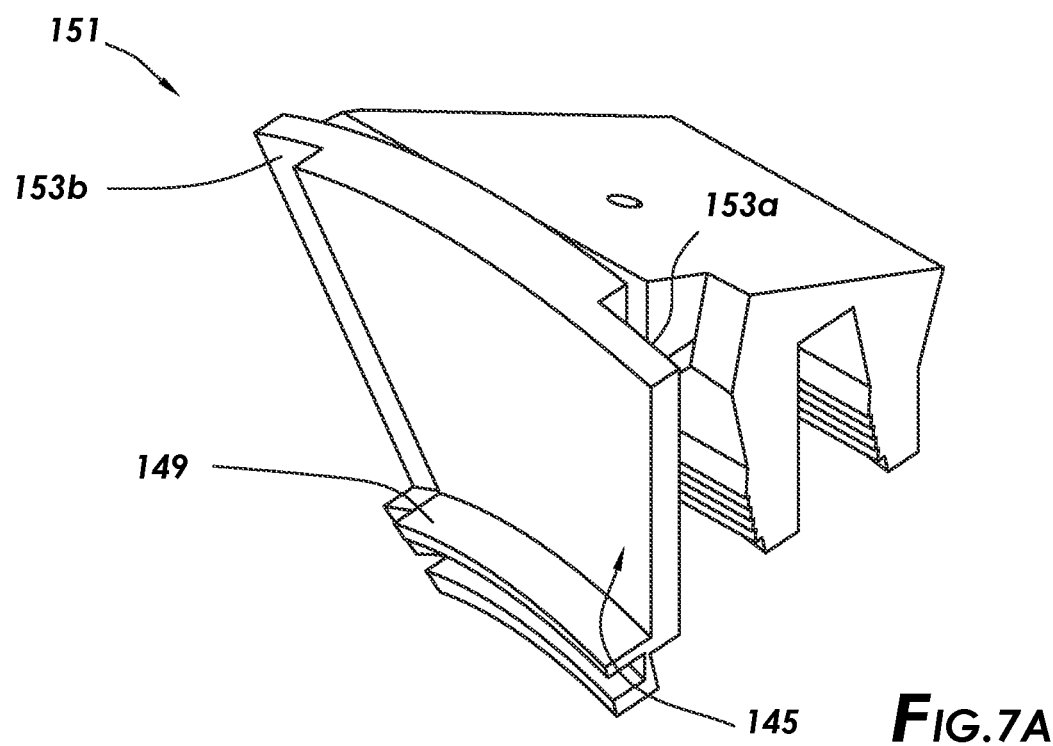
FIGS. 7A, 7B depict perspective views of a seal expansion ring segment of the seal expansion ring of FIG. 7.
Figure 7B:
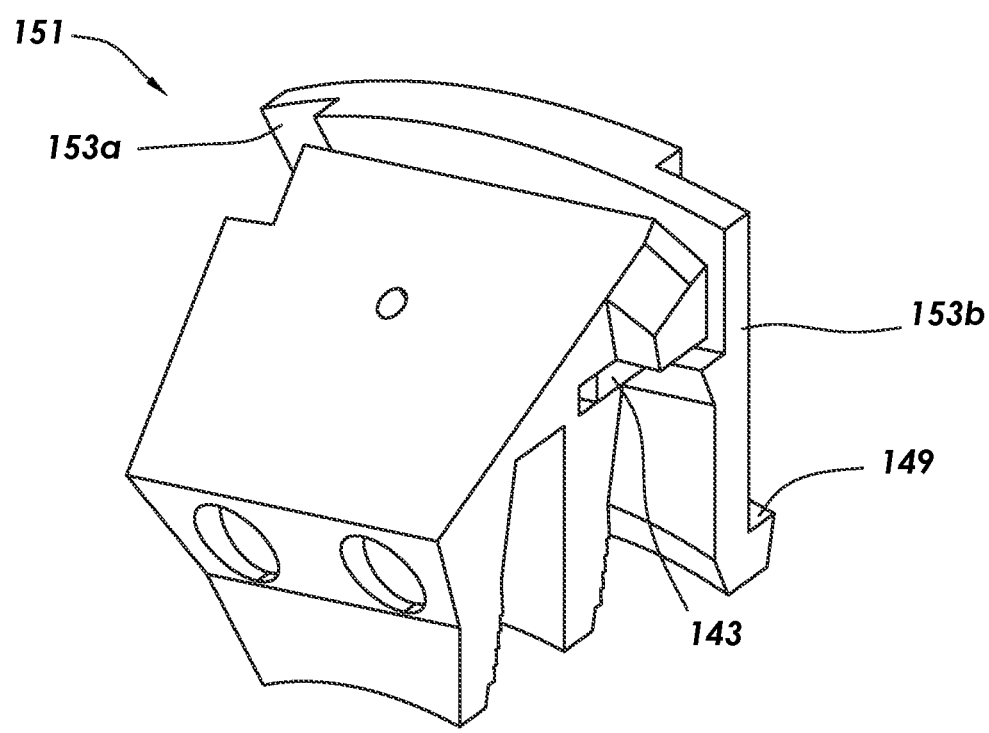
Figure 7C:
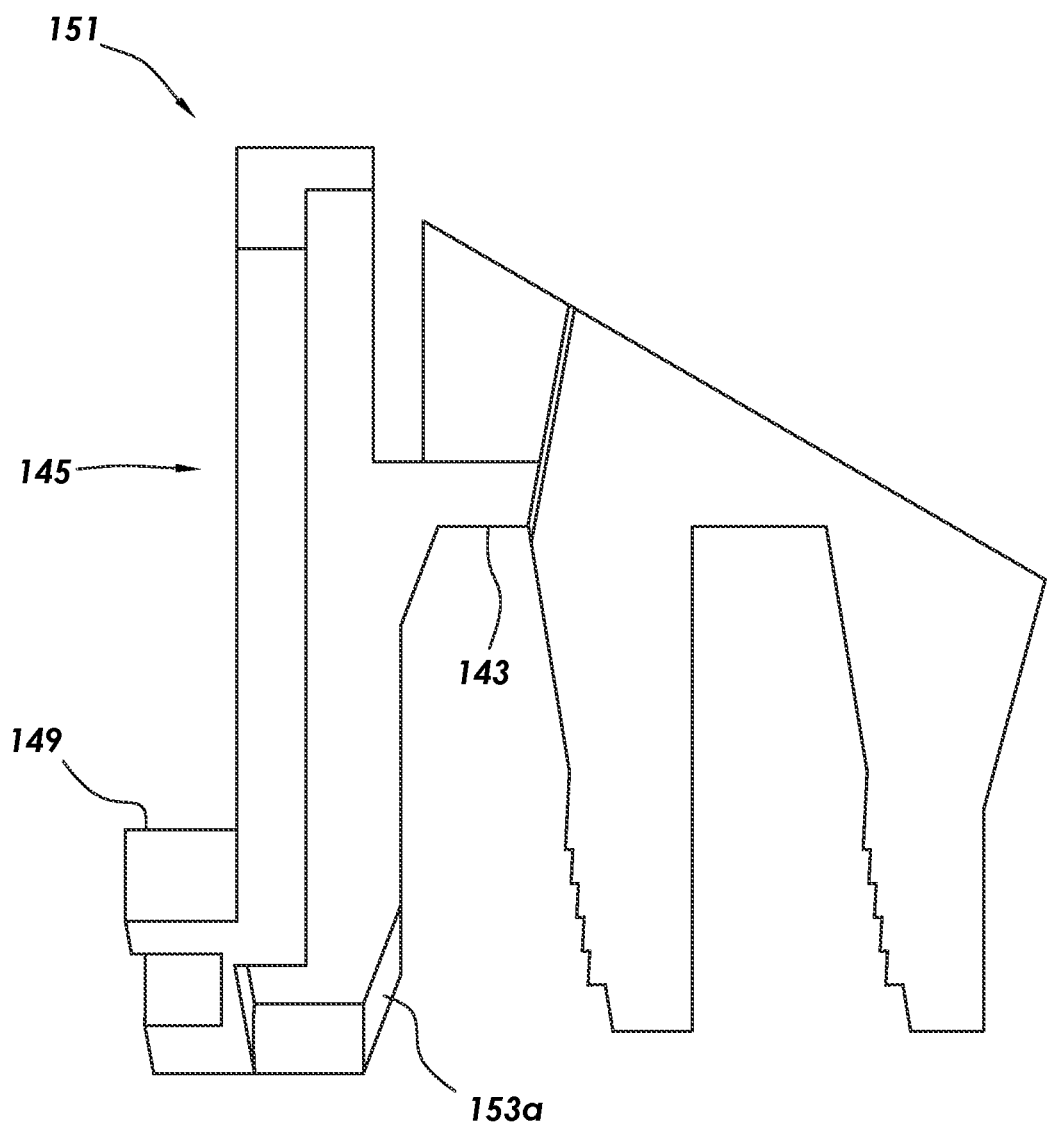
FIGS. 7C, 7D depict end views of a seal expansion ring segment of the seal expansion ring of FIG. 7.
Figure 7D:
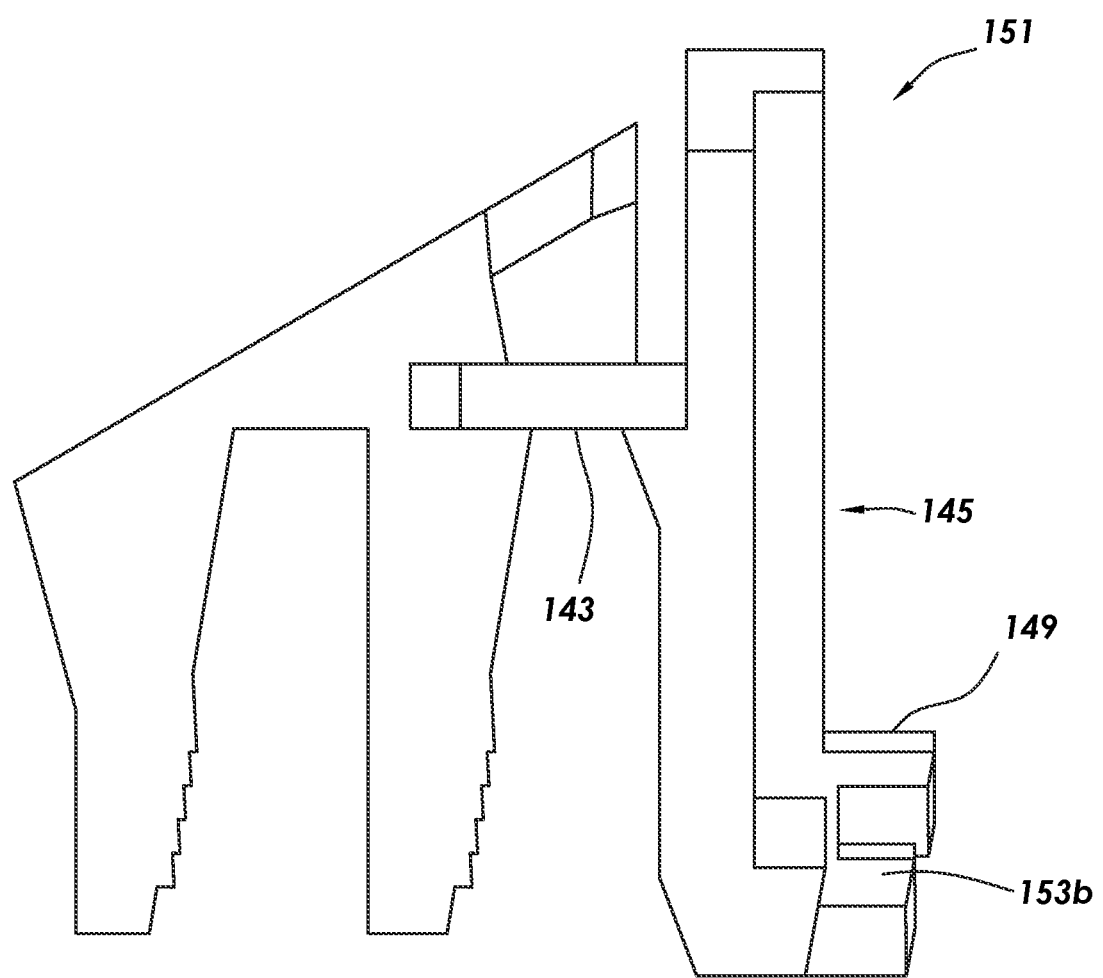

In some embodiments, as shown in FIG. 7, seal expansion ring 141 may be formed from a plurality of expansion ring segments 151. In such an embodiment, as shown in FIGS. 7A, 7B, 7C, 7D, each expansion ring segment 151 may include a portion of expansion boss 143, seal roof, and seal lip 149. In some such embodiments, each expansion ring segment 151 may be slidingly interlocked to an adjacent expansion ring segment 151 on either circumferential side of expansion ring segment 151. In some such embodiments, each expansion ring segment may include expansion ring rabbets 153a, 153b. In some embodiments, expansion ring rabbets 153a, 153b may be configured such that expansion ring rabbets 153a, 153b of adjacent expansion ring segments 151 allow relative sliding motion between the adjacent expansion ring segments 151 as seal expansion ring 141 moves from a retracted configuration to an extended configuration.

Figure 7E:
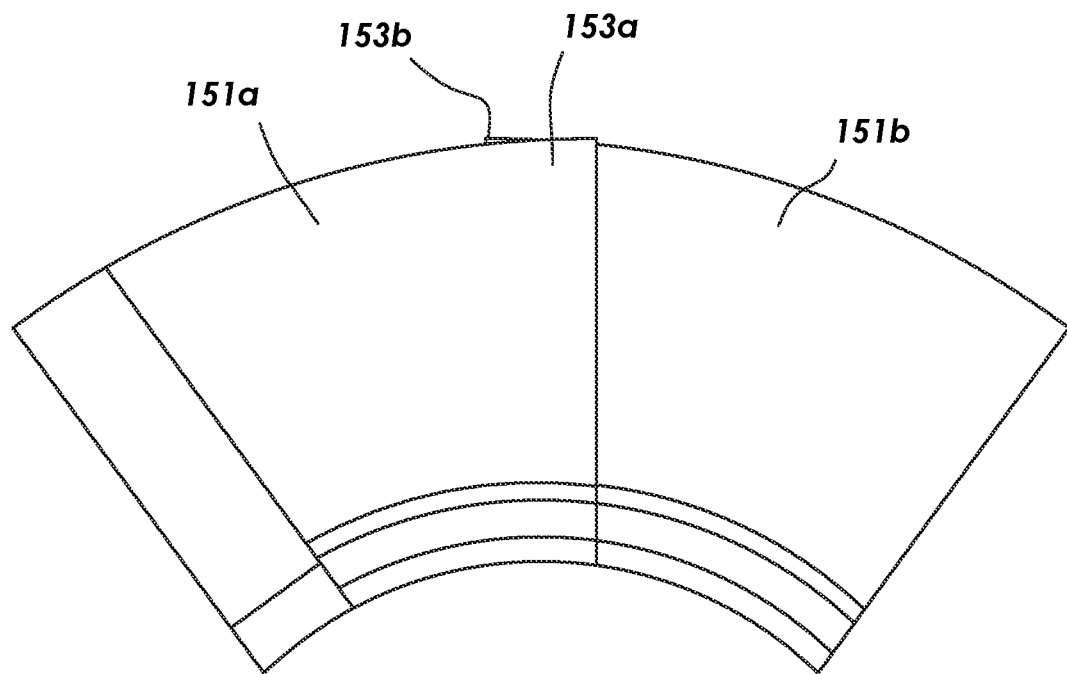
FIGS. 7E, 7F depict perspective views of two interlocked seal expansion ring segments in a retracted configuration and extended configuration, respectively.
Figure 7F:
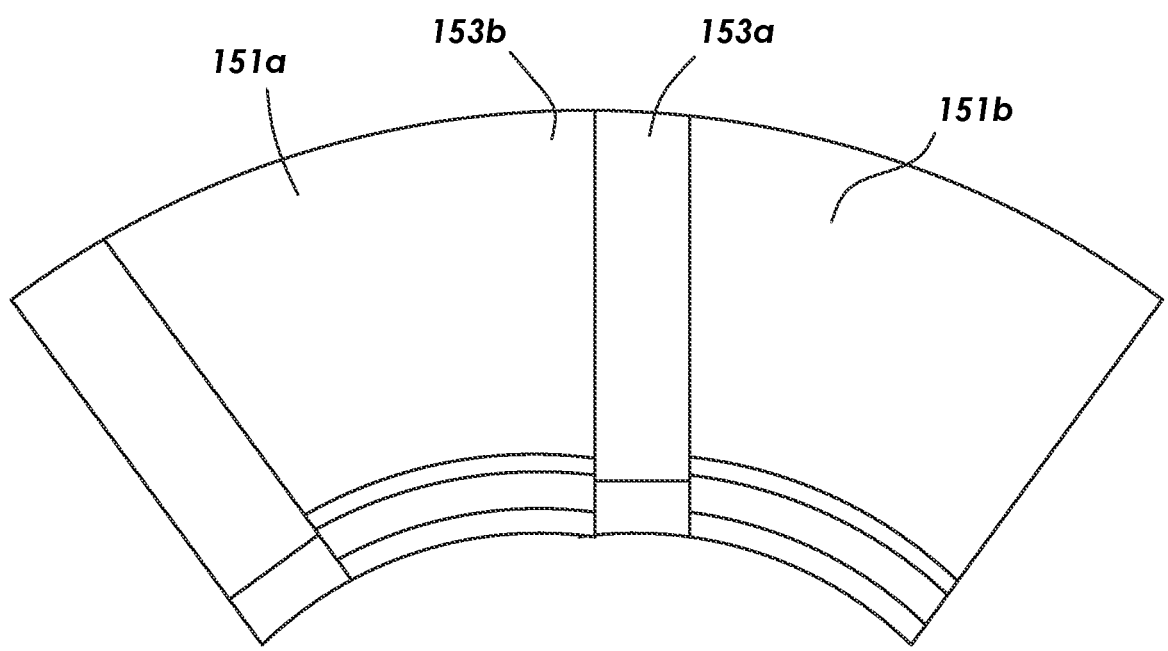
Figure 7G:
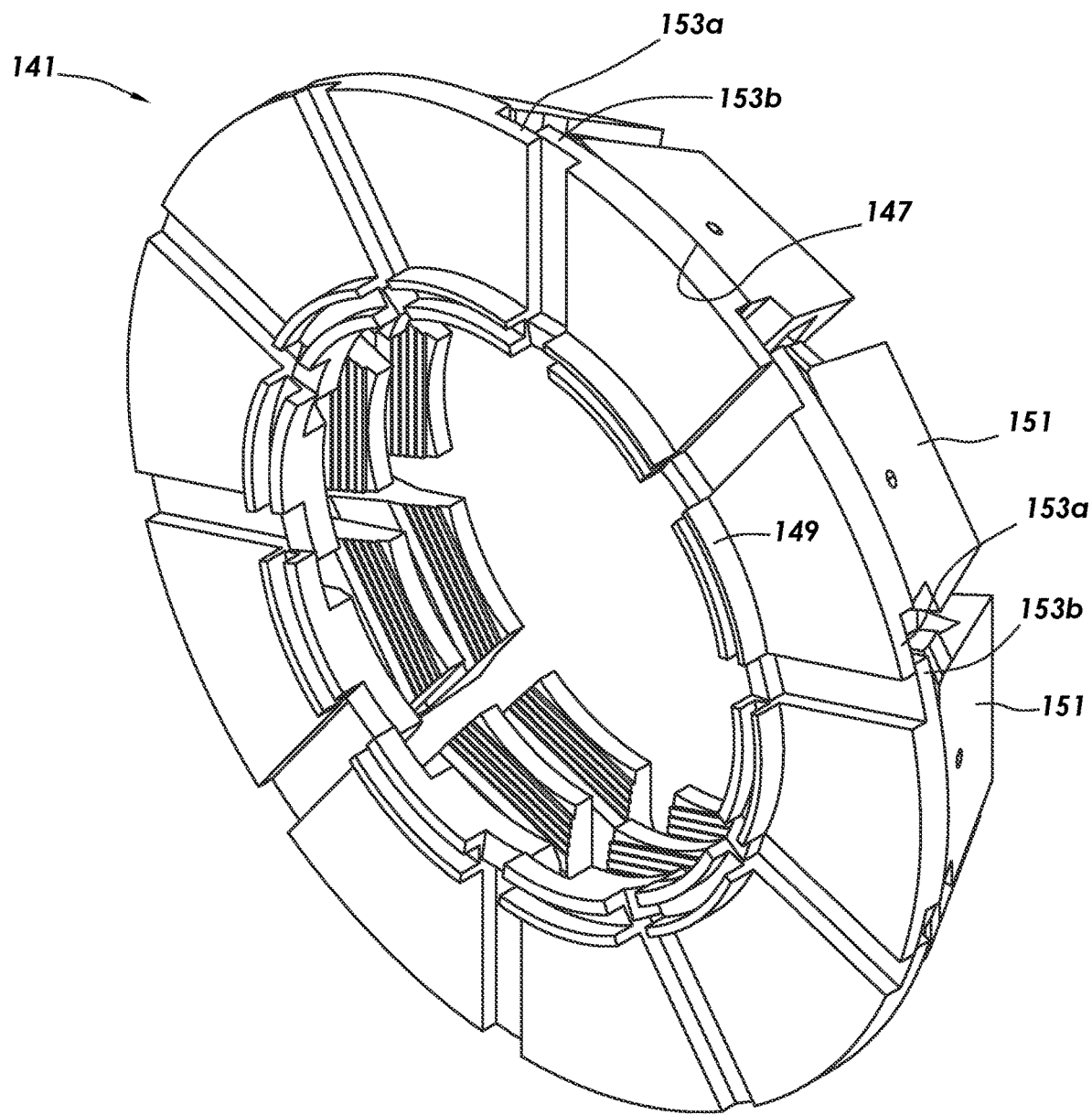
FIG. 7G depicts a perspective view of the seal expansion ring of FIG. 7 in an extended configuration.

As an example, FIG. 7E depicts expansion ring segments 151a and 151b positioned such that expansion ring segments 151a and 151b are directly adjacent with expansion ring rabbets 153a, 153b fully interlocked. Such a configuration may occur for expansion ring segments 151 when seal expansion ring 141 is in the run-in configuration. FIG. 7F depicts expansion ring segments 151a and 151b positioned such that expansion ring segments 151a and 151b have slid circumferentially apart along expansion ring rabbets 153a, 153b. The separation along expansion ring rabbets 153a, 153b may increase as the radial expansion of seal expansion ring 141 increases. In some embodiments, expansion ring rabbets 153a, 153b may be formed such that the direction in which adjacent expansion ring segments 151a, 151b separate is linear.

Figure 8:
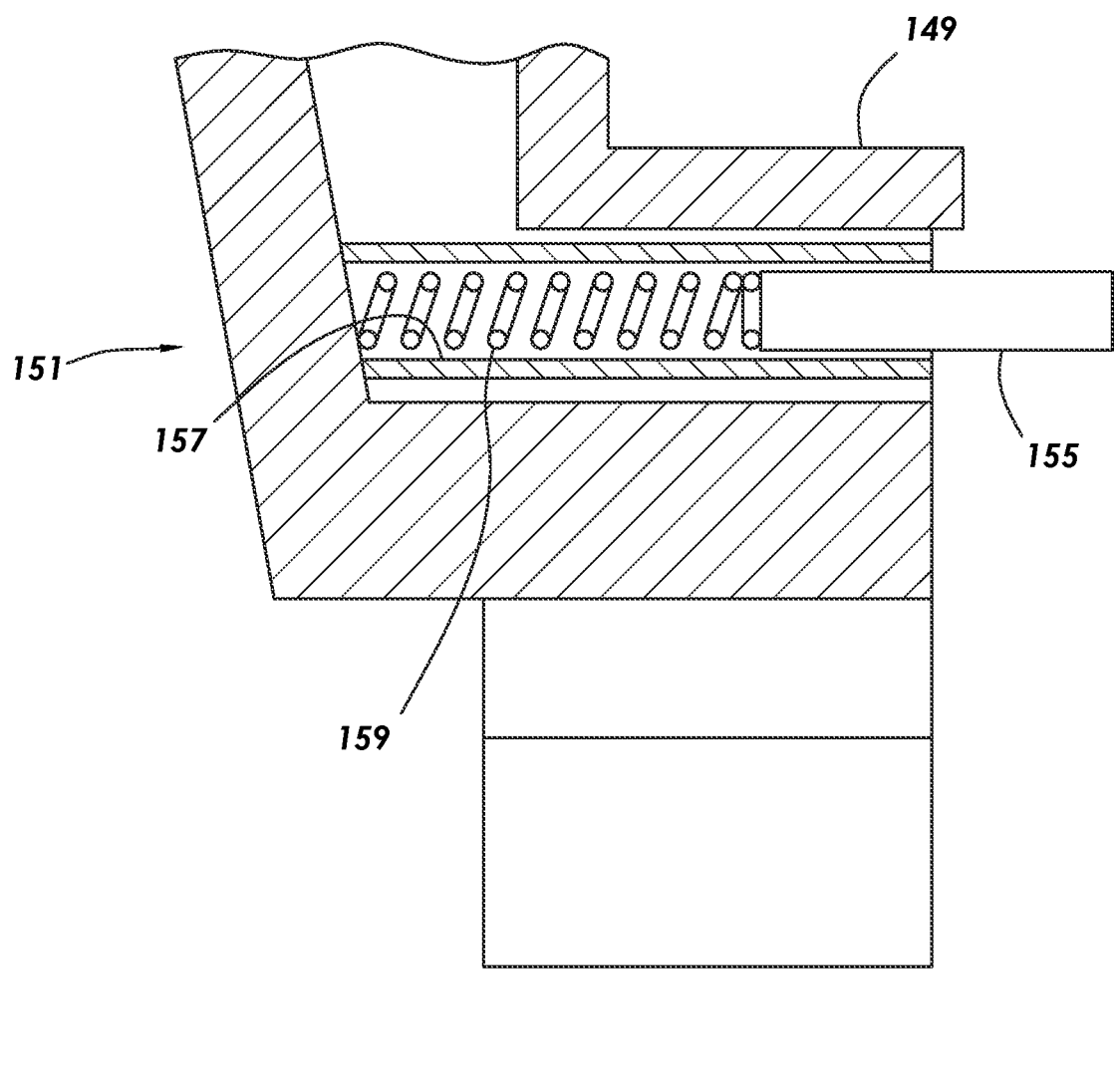
FIG. 8 depicts a partial end view of a seal expansion ring segment consistent with at least one embodiment of the present disclosure.

In some embodiments, as shown in FIG. 8, each expansion ring segment 151 may include extrusion guard 155. Extrusion guard 155 may, in some embodiments, be coupled to expansion ring segment 151 at a position radially inward from seal lip 149. Extrusion guard 155 may extend from expansion ring segment 151 to squeezer assembly 181 and may, for example and without limitation, reduce or prevent extrusion of primary seal ring 161 radially inwardly between seal expansion ring 141 and squeezer assembly 181. In some embodiments, extrusion guard 155 may be at least partially positioned within guard slot 157 formed in expansion ring segment 151 and may be biased into an extended position by guard spring 159 such that extrusion guard 155 remains in contact with squeezer assembly 181 throughout the range of radial motion of seal expansion ring 141.

Figure 9:
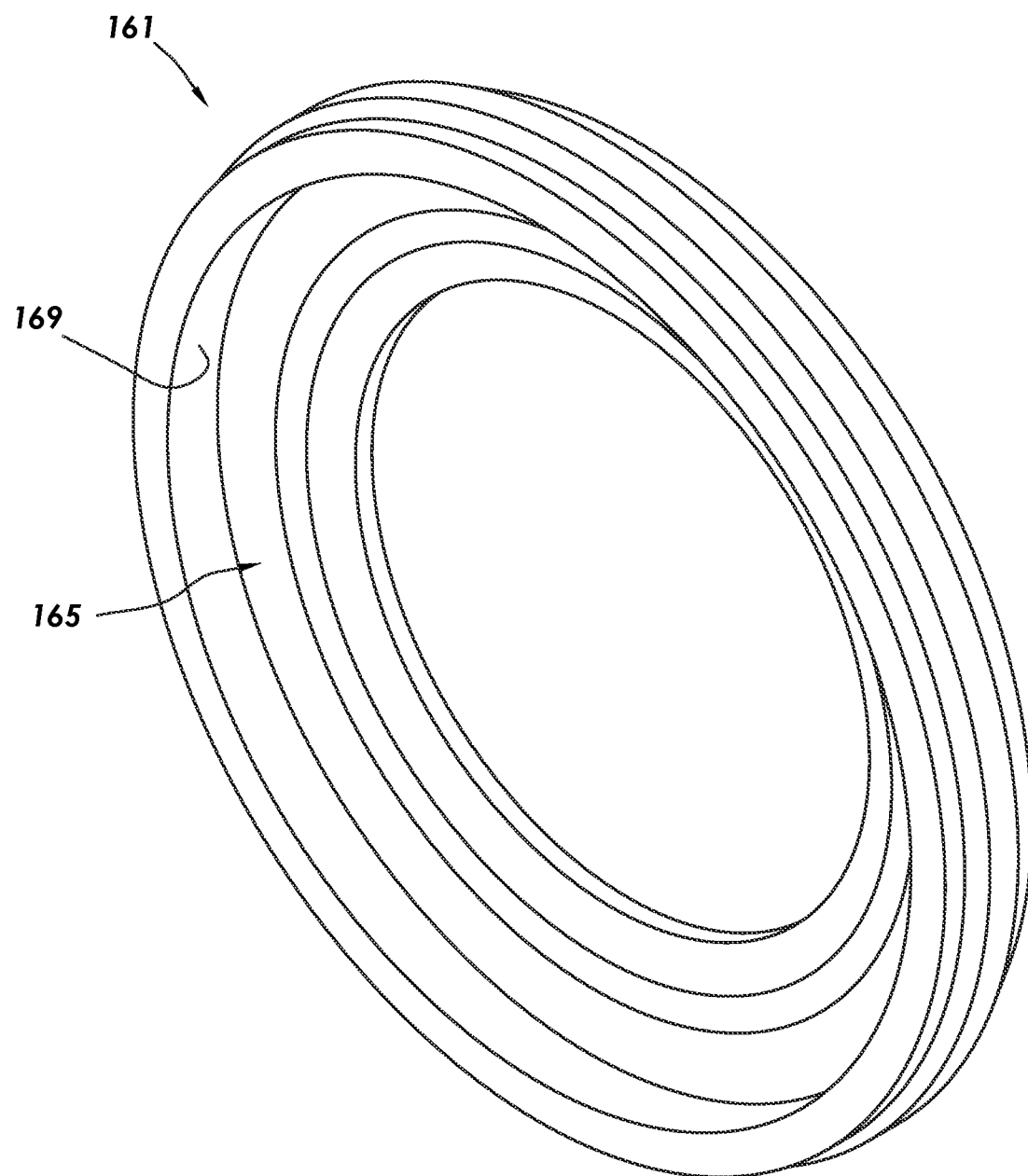
FIG. 9 depicts a perspective view of a seal ring consistent with at least one embodiment of the present disclosure.

In some embodiments, with respect to FIG. 5, primary seal ring 161 may be generally annular in shape and may be adapted to be positioned about plug body 101 in a space defined between seal expansion ring 141, squeezer assembly 181, and secondary tapered ring 201. As discussed below, primary seal ring 161 may be engaged by squeezer assembly 181 such that primary seal ring 161 engages pipeline 10. In some embodiments, with reference to FIGS. 9, 9A, primary seal ring 161 may be formed to generally correspond to the profiles of seal expansion ring 141, squeezer assembly 181, and secondary tapered ring 201. In such an embodiment, primary seal ring 161 may include expansion ring face 163 formed to fit into seal pocket 145 as discussed above with respect to FIG. 5. Primary seal ring 161 may further include squeezer face 165 positioned in abutment with squeezer assembly 181. In some embodiments, squeezer face 165 may be tapered at an angle similar to the taper angle of seal face 187 of squeezer assembly 181 as further described below. In some embodiments, the taper angle of squeezer face 165 and seal face 187 may be approximately equal to the taper angle of between pressure head 231 and secondary tapered ring 201.

In some embodiments, primary seal ring 161 may include undercut 167 formed radially inward of squeezer face 165 and may be formed at a larger taper angle than squeezer face 165. Undercut 167 may, for example and without limitation, define an area of primary seal ring 161 that is not in abutment with seal face 187 of squeezer assembly 181. In such an embodiment, without being bound to theory, undercut 167 may reduce the likelihood that primary seal ring 161 is extruded through the gap between seal expansion ring 141 and squeezer assembly 181.

Figure 9A:
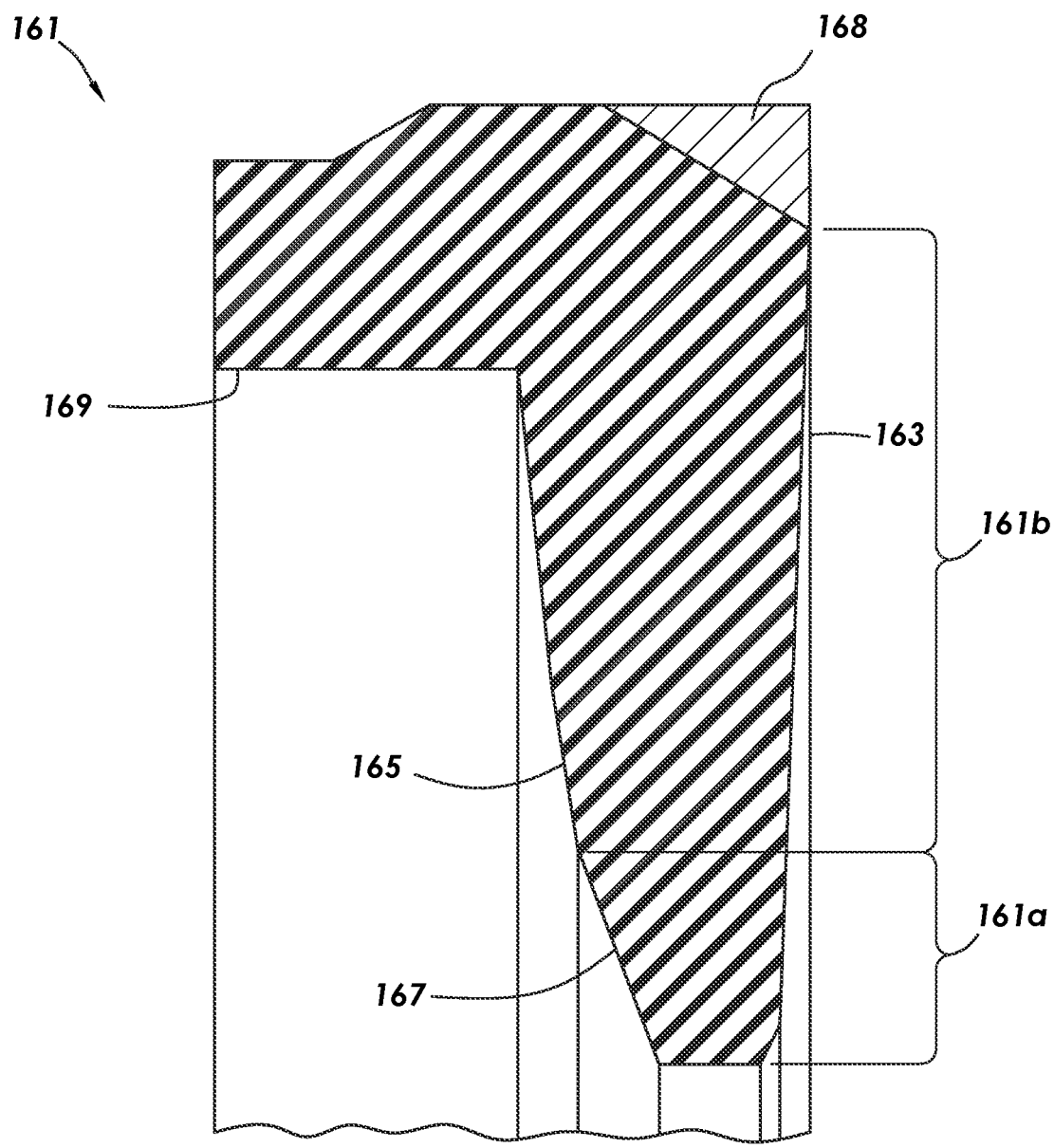
FIG. 9A depicts a partial cross section view of the seal ring of FIG. 9.

Primary seal ring 161 may be formed from an elastomeric material. In some embodiments, at least a portion of primary seal ring 161 may be formed from an elastomeric material that is harder than another portion of primary seal ring 161. For example, as shown in FIG. 9A, in some embodiments, the radially inner portion of primary seal ring 161, designated 161a, may be formed from a harder elastomeric material than the rest of primary seal ring 161, designated 161b. In such an embodiment, the harder elastomeric material of 161a may reduce the likelihood that primary seal ring 161 is extruded through the gap between seal expansion ring 141 and squeezer assembly 181 while allowing the rest of primary seal ring 161 to be formed from a softer elastomeric material 161b that more readily deforms during the actuation operation of seal assembly 121 as further described herein below. In some embodiments, primary seal ring 161 may include radially outer portion 168 formed from a harder material to, for example and without limitation, reduce the likelihood that primary seal ring 161 is extruded through a gap between seal expansion ring 141 and pipeline 10.

Figure 10:
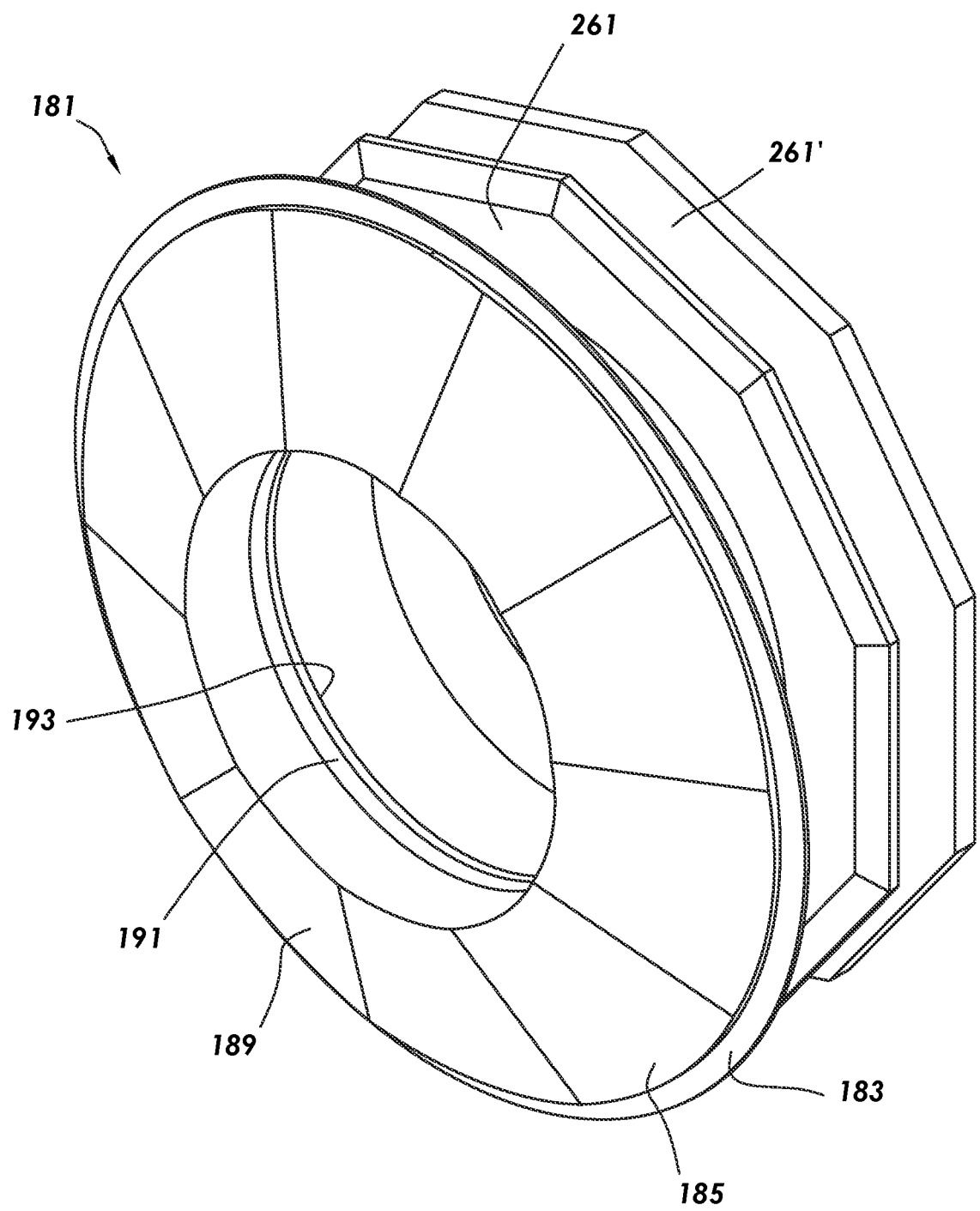
FIG. 10 depicts a perspective view of a squeezer assembly consistent with at least one embodiment of the present disclosure.
Figure 10A:
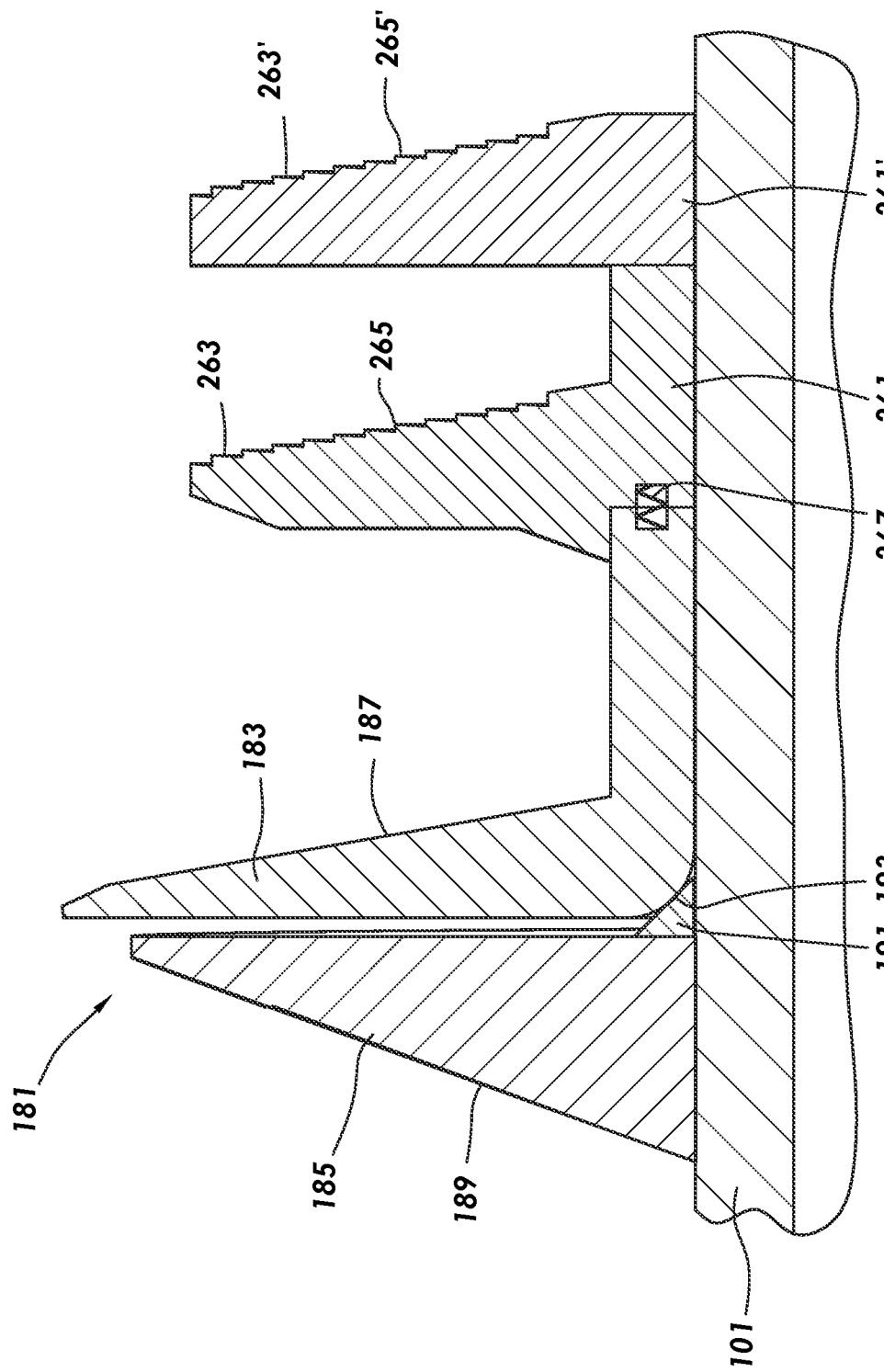
FIG. 10A depicts a cross section view of the squeezer assembly of FIG. 10.

In some embodiments, with respect to FIG. 10, squeezer assembly 181 may include large squeezer ring 183 and small squeezer ring 185 positioned about plug body 101. In some embodiments, large squeezer ring 183 and small squeezer ring 185 are each wedge-shaped in cross-section as shown in FIG. 10A. In some embodiments, large squeezer ring 183 includes seal face 187. Seal face 187, as discussed above, may be formed to have a taper corresponding to the taper of squeezer face 165 of primary seal ring 161.

In some embodiments, small squeezer ring 185 may include wedge face 189. Wedge face 189 may be formed to abut wedge squeezer face 203 of secondary tapered ring 201. In some embodiments, wedge face 189 may be formed with a taper at an angle corresponding to a taper formed in wedge squeezer face 203 of secondary tapered ring 201 such that longitudinal movement of secondary tapered ring 201 relative to squeezer assembly 181 biases secondary tapered ring 201 radially outward from plug body 101. In some embodiments, the taper angle of wedge face 189 and wedge squeezer face 203 may correspond with the taper angle of pressure head 231 and secondary tapered ring 201. In some embodiments, wedge face 189 may be oriented to face the opposite direction as seal face 187.

In certain embodiments, large squeezer ring 183 and small squeezer ring 185 may be longitudinally separated along plug body 101 by inner seal 191. Inner seal 191 may be positioned about and in abutment with plug body 101. In some embodiments, inner seal 191 may be positioned such that as seal assembly 121 is actuated, large squeezer ring 183 and small squeezer ring 185 are biased into contact with inner seal 191. While inner seal 191 is compressed by large squeezer ring 183, small squeezer ring 185, and plug body 101, inner seal 191 may provide a fluid seal to retard or resist fluid flow between squeezer assembly 181 and plug body 101. As the bias force is also exerted between large squeezer ring 183 and primary seal ring 161 at the interface of squeezer face 165 and seal face 187, a fluid seal is also formed between squeezer assembly 181 and primary seal ring 161 to retard or resist fluid flow between squeezer assembly 181 and primary seal ring 161.

In some embodiments, inner seal 191 may be triangular in cross section. In some embodiments, large squeezer ring 183 may include inner seal face 193 positioned to engage inner seal 191. In some embodiments, inner seal face 193 may be radiused or otherwise curved to, for example and without being bound to theory, increase the contact area between large squeezer ring 183 and inner seal 191. In some embodiments, inner seal 191 may be formed as part of primary seal ring 161. In such an embodiment, inner seal 191 may be connected to primary seal ring 161 by a continuous flange or one or more continuous or discontinuous features. In some embodiments, a portion of primary seal ring 161 may extend at least partially between large squeezer ring 183 and small squeezer ring 185.

In some embodiments, with reference to FIG. 5, primary seal ring 161 may include return flange 169. Return flange 169 may engage with return pocket 205 of secondary tapered ring 201 and may, for example and without limitation, assist with retraction of secondary tapered ring 201 when seal assembly 121 is retracted as further described herein below.

In some embodiments, secondary tapered ring 201 may be generally annular and may be positioned about plug body 101. In some embodiments, secondary tapered ring 201 may include wedge squeezer face 203 that, as discussed above, is tapered and abuts wedge face 189 of squeezer assembly 181. In some embodiments, return pocket 205 may be positioned radially outward from wedge face 189 on secondary tapered ring 201. In some embodiments, return flange 169 of primary seal ring 161 may be generally rectangular in cross section. In some embodiments, return pocket 205 may be configured such that return flange 169 does not fully enter return pocket 205 when seal assembly 121 is in the run-in position to, for example and without limitation, account for the relative longitudinal movement between primary seal ring 161 and secondary tapered ring 201 during actuation of seal assembly 121.

In some embodiments, secondary tapered ring 201 may include wedge extension face 207. Wedge extension face 207 may be positioned opposite wedge squeezer face 203 such that wedge extension face 207 engages pressure head 231. In some embodiments, wedge extension face 207 is formed with a taper angle that corresponds with or is similar to wedge face 233 of pressure head 231 such that longitudinal movement of pressure head 231 relative to secondary tapered ring 201 biases secondary tapered ring 201 radially outward from plug body 101. In some embodiments, the taper angle of wedge face 233 of pressure head 231 and wedge extension face 207 may correspond with the taper angle of pressure head 231 and secondary tapered ring 201.

Figure 11:
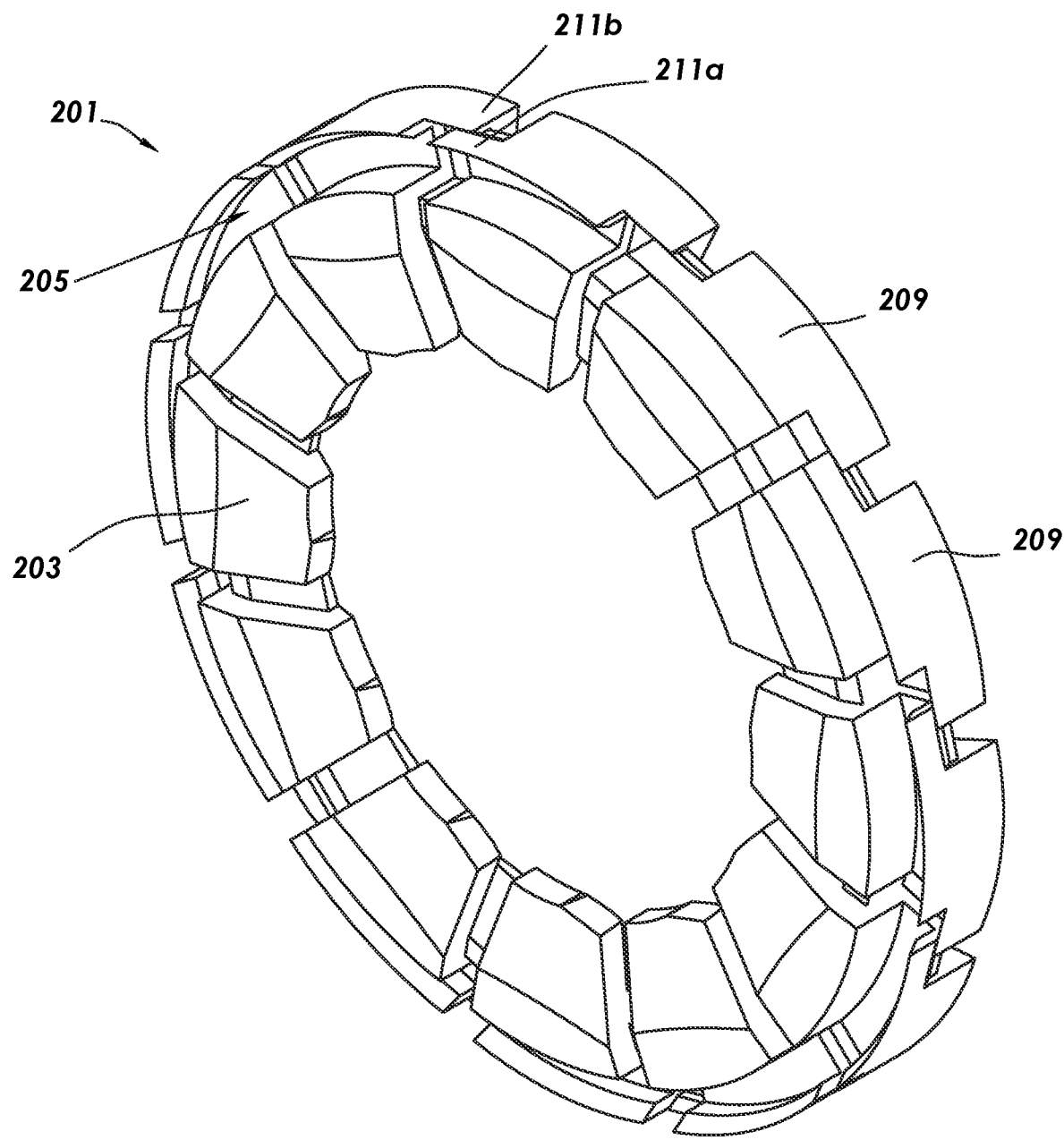
FIG. 11 depicts a perspective view of a secondary tapered ring consistent with at least one embodiment of the present disclosure.
Figure 11A:
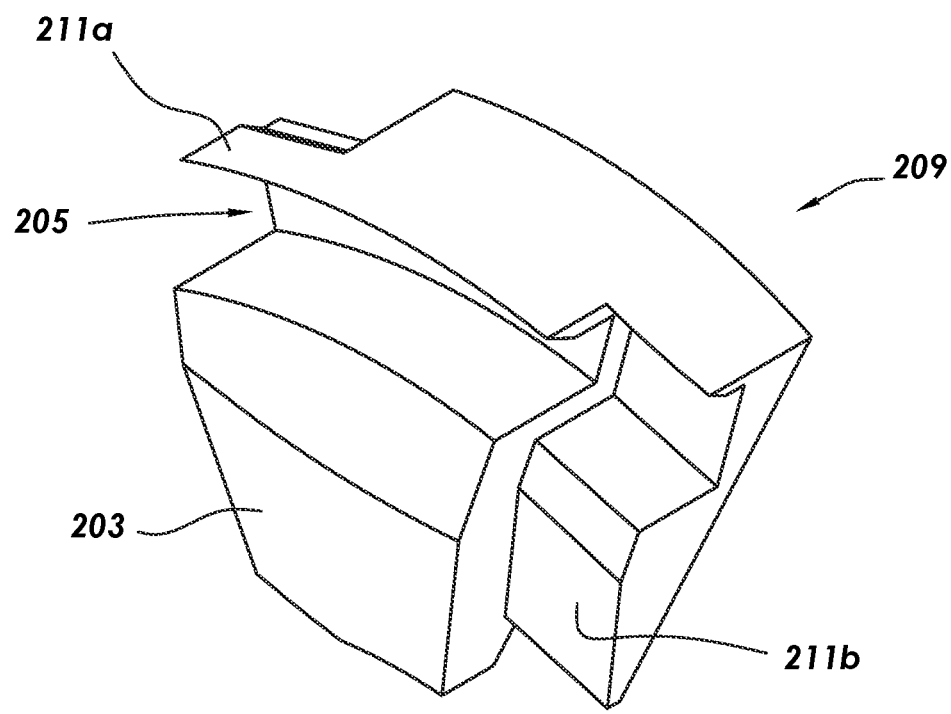
FIGS. 11A, 11B depict perspective views of wedge segments of the secondary tapered ring of FIG. 11.
Figure 11B:
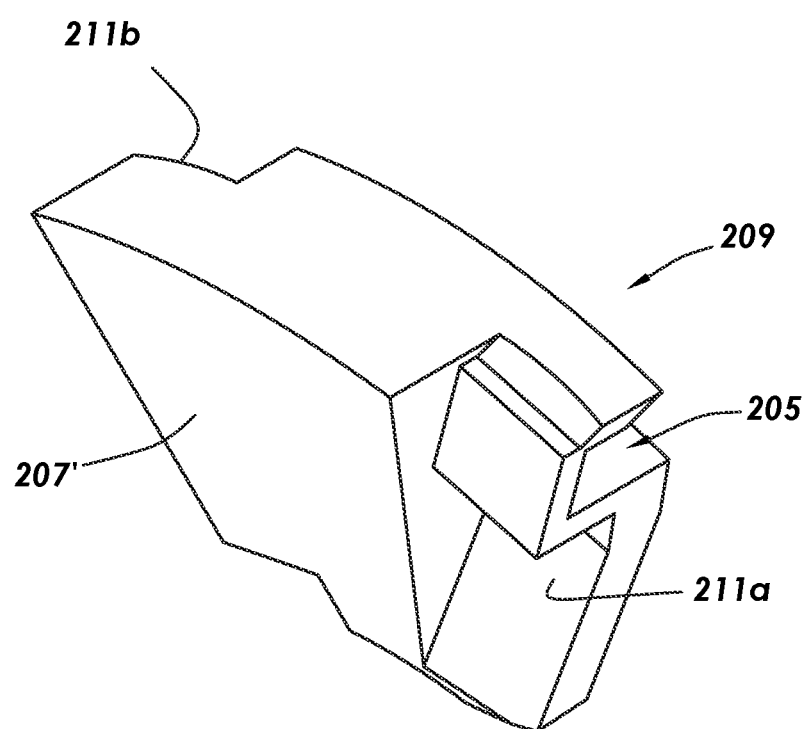
Figure 11D:
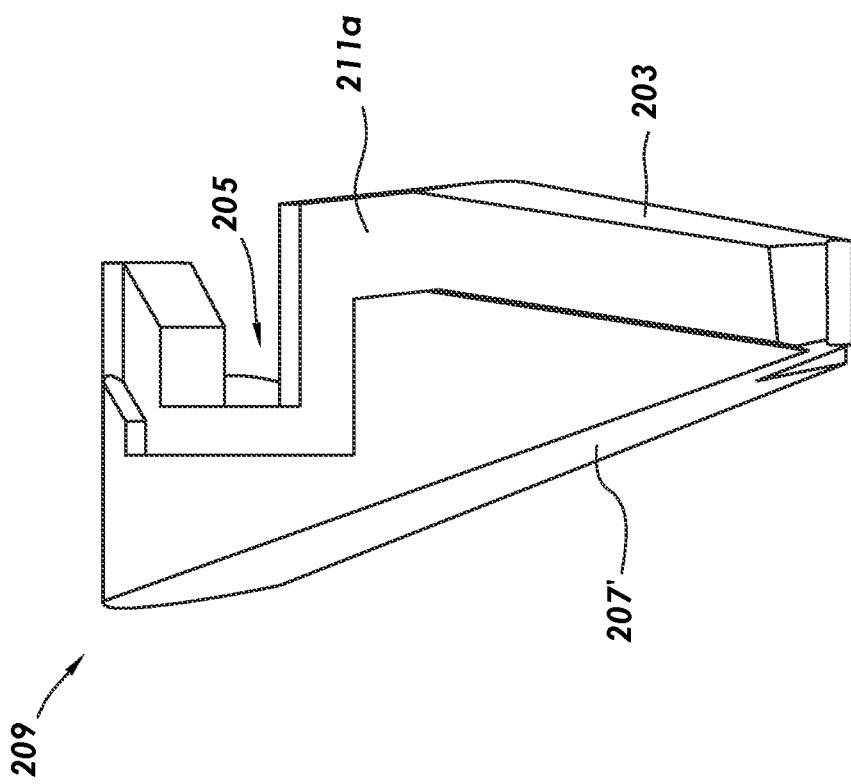
FIGS. 11C, 11D depict end views of a wedge segment of the secondary tapered ring of FIG. 11.
Figure 11C:
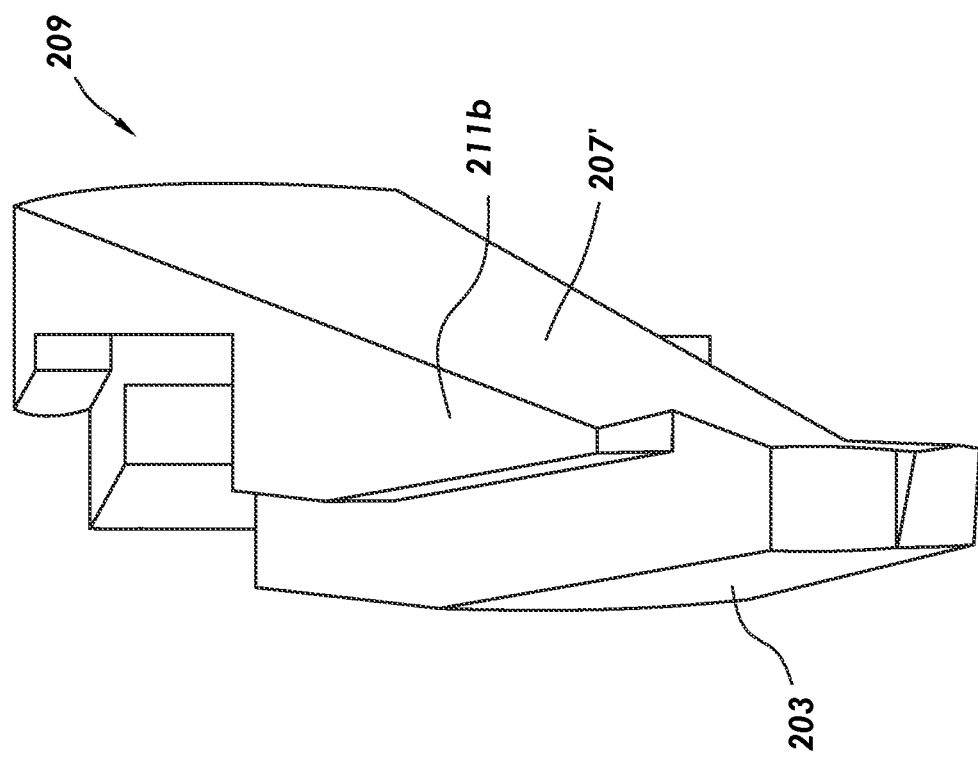

In some embodiments, as shown in FIG. 11, secondary tapered ring 201 may be formed from a plurality of wedge segments 209. In such an embodiment, as shown in FIGS. 11A, 11B, 11C, 11D, each wedge segment 209 may include a portion of wedge extension face 207 and return pocket 205. In some such embodiments, each wedge segment 209 may be slidingly interlocked to an adjacent wedge segment 209 on either circumferential side of wedge segment 209. In some such embodiments, each wedge segment 209 may include wedge rabbets 211a, 211b. In some embodiments, wedge rabbets 211a, 211b may be configured such that wedge rabbets 211a, 211b of adjacent wedge segments 209 allow relative sliding motion between the adjacent wedge segments 209 as secondary tapered ring 201 moves from a retracted configuration to an extended configuration as discussed above. In some embodiments, as depicted for example in FIGS. 11A-F, wedge segments 209 may include wedge rabbets 211a, 211b such that each wedge segment 209 is identical. In other embodiments, similar to as described herein above with respect to FIG. 7H, secondary tapered ring 201 may include wedge segments 209 configured such that some wedge segments 209 include wedge rabbets 211a on each side and each wedge segment 209 includes wedge rabbets 211b.

Figure 11E:
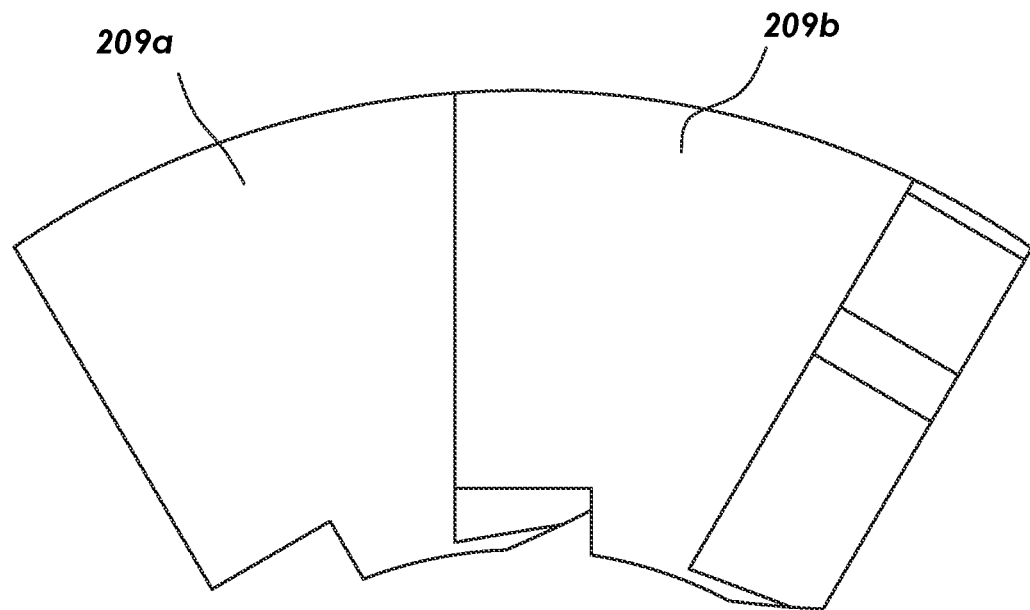
FIGS. 11E, 11F depict perspective views of two interlocked wedge segments in a retracted configuration and extended configuration, respectively.
Figure 11F:
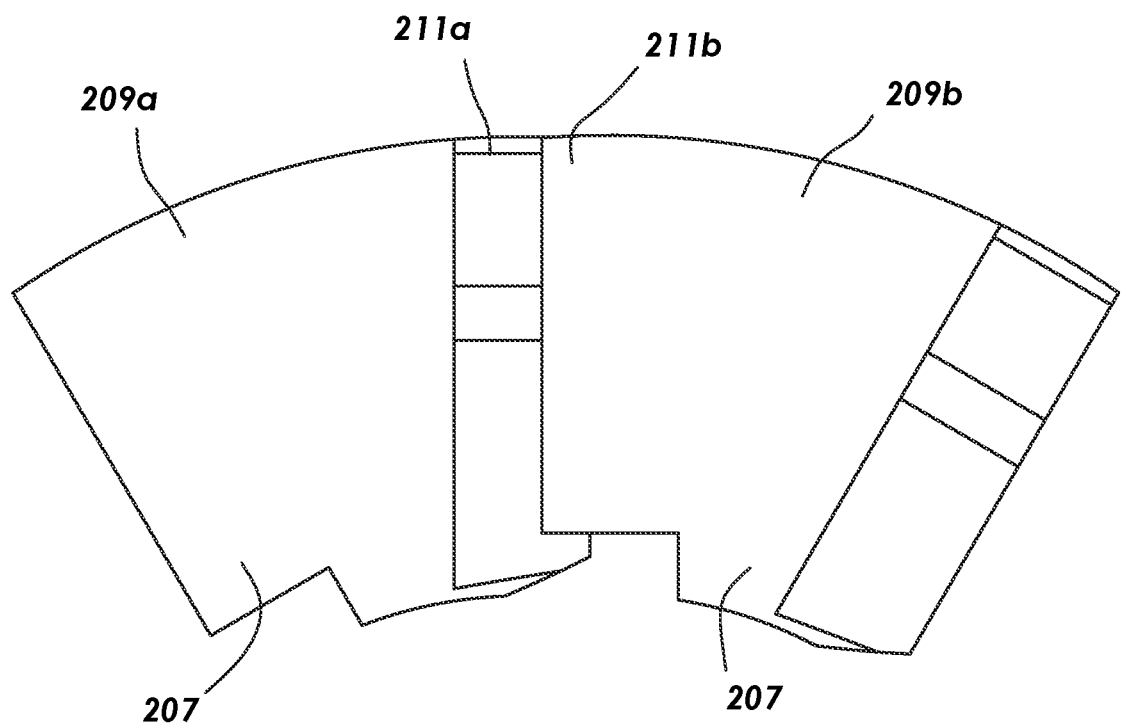

As an example, FIG. 11E depicts wedge segments 209a and 209b positioned such that wedge segments 209a and 209b are directly adjacent with wedge rabbets 211a, 211b fully interlocked. Such a configuration may occur for wedge segments 209 when secondary tapered ring 201 is in the retracted configuration. FIG. 11F depicts wedge segments 209a and 209b positioned such that wedge segments 209a and 209b have slid circumferentially apart along wedge rabbets 211a, 211b. The separation along wedge rabbets 211a, 211b may increase as the radial expansion of secondary tapered ring 201 increases. In some embodiments, wedge rabbets 211a, 211b may be formed such that the direction in which adjacent wedge segments 209a, 209b separate is linear. In some embodiments, wedge segments 209a, 209b may include wedge rabbets 211a, 211b such that each wedge segment 209a and 209b is identical. In other embodiments, similar to as discussed with respect to FIG. 7H, secondary tapered ring 201 may include wedge segments 209a and 209b configured such that wedge segments 209a include wedge rabbets 211a on each side and each adjacent wedge segments 209b includes wedge rabbets 211b.

In certain embodiments in which secondary tapered ring 201 is formed from a plurality of wedge segments 209, each wedge segment 209 may include a portion of wedge extension face 207 of secondary tapered ring 201. In some such embodiments, wedge extension face 207 of secondary tapered ring 201 may be formed from a plurality of planar facets 207', each planar facet 207' formed on a corresponding wedge segment 209. In such an embodiment, wedge face 233 of pressure head 231 may be formed from a plurality of planar facets 233' as shown in FIG. 12 wherein each planar facet 233' of wedge face 233 corresponds with a planar facet 207' of wedge extension face 207. In such an embodiment, for example and without limitation, manufacturing complexity for wedge segments 209 may be simplified as compared to an embodiment in which wedge extension face 207 and wedge face 233 are frustoconical.

Figure 12A:
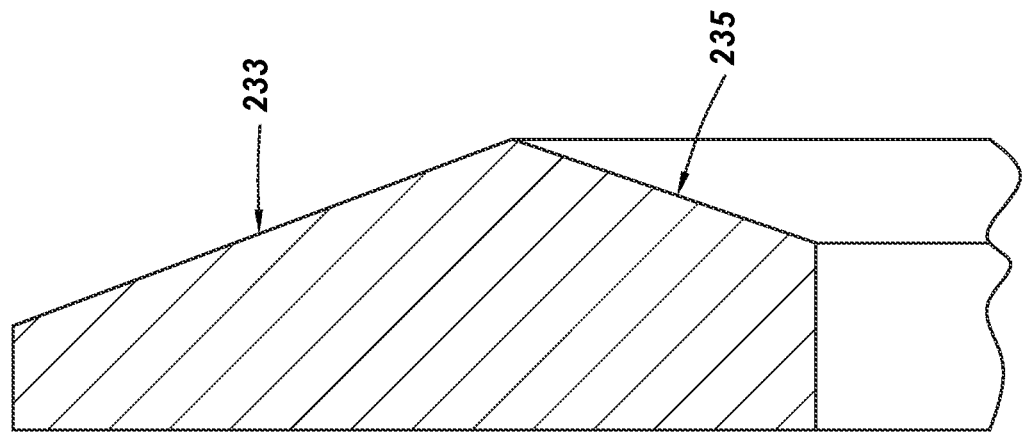
FIG. 12A depicts a partial cross section view of the pressure head of FIG. 12.
Figure 12:
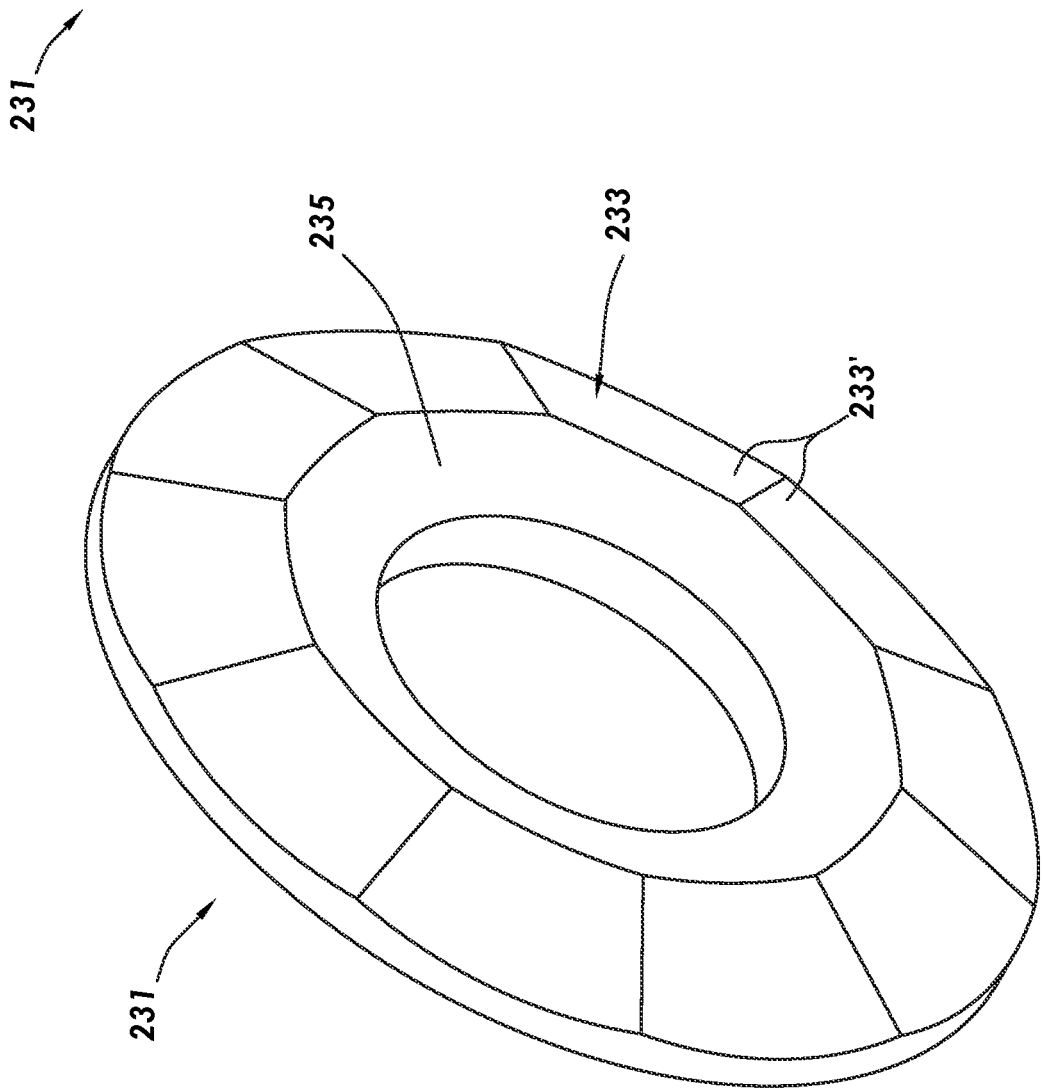
FIG. 12 depicts a perspective view of a pressure head consistent with at least one embodiment of the present disclosure.

In some embodiments, as shown in FIGS. 12, 12A, pressure head 231 may include squeezer undercut 235. Squeezer undercut 235 may be positioned radially within wedge face 233 and may be positioned to at least partially receive small squeezer ring 185 when seal assembly 121 is fully actuated (as shown in FIG. 6).

In some embodiments, the face of pressure head 231 opposite wedge face 233 may be coupled to movable head 107 of pipeline plug 100 such that pressure head 231 is moved in response to movement of movable head 107 of pipeline plug 100. In some embodiments, such as shown in FIG. 1, pressure head 231 may be coupled to movable head 107 via gripper assembly 111.

The configuration of seal expansion ring 141, primary seal ring 161, squeezer assembly 181, secondary tapered ring 201, and pressure head 231 as indicated herein above is consistent with at least the embodiments so described. In some embodiments, the order of certain components within seal assembly 121 may be modified including, for example and without limitation, the repositioning of seal expansion ring 141 and secondary tapered ring 201 relative to gripper assembly 111 and pressure head 231. In some embodiments, primary seal ring 161 may be configured in different positions than those described herein above.

Figure 13:
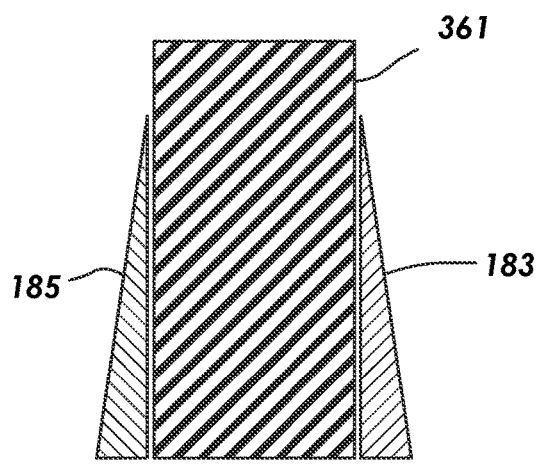
FIGS. 13-16 depict configurations of primary seals and squeezer assemblies, each consistent with at least one embodiment of the present disclosure.
Figure 14:
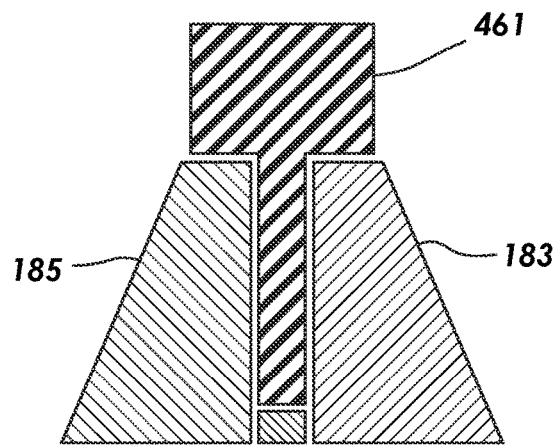

For example, FIG. 13 shows an embodiment in which primary seal ring 361 is positioned partially between large squeezer ring 183 and small squeezer ring 185. In such an embodiment, inner seal 191 as described herein above may be formed as part of primary seal ring 361. FIG. 14 shows an embodiment in which primary seal ring 461 is positioned partially between large squeezer ring 183 and small squeezer ring 185, wherein inner seal 191 is formed separately from primary seal ring 361.

Figure 15:
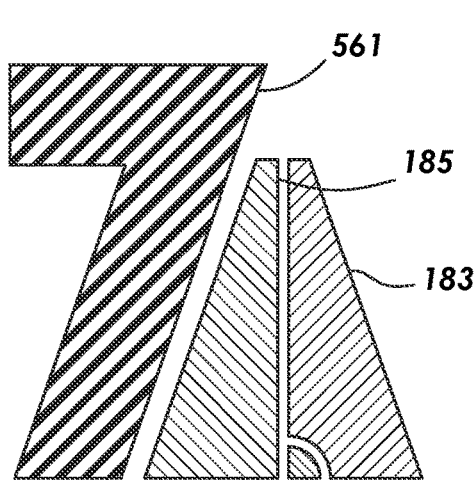
Figure 16:
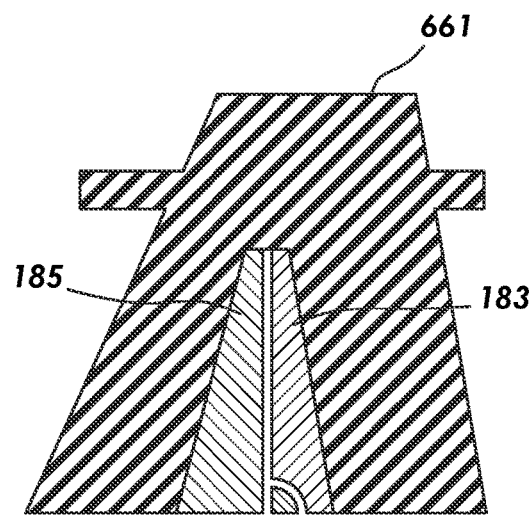

FIG. 15 depicts an embodiment in which primary seal ring 561 is positioned adjacent small squeezer ring 185 rather than large squeezer ring 183 as described with respect to above-discussed embodiments. FIG. 16 depicts an embodiment in which primary seal ring 661 is positioned about both small squeezer ring 185 and large squeezer ring 183.

As discussed above, with reference to FIG. 5, gripper assembly 111 may include inner locking body 261, gripper bodies 281, sliding grippers 301, and actuator assembly 321. In some embodiments, inner locking body 261 may be annular or tubular. In some embodiments, inner locking body 261 may abut squeezer assembly 181. In some embodiments, inner locking body 261 may include locking face 263 as shown in FIG. 10A. Locking face 263, in some embodiments, may include locking stairsteps 265 positioned to engage with gripper bodies 281 as further described below. In some embodiments, inner locking body 261 may include second locking face 263'. In some embodiments, second locking face 263' may be formed on second inner locking body 261', which may abut inner locking body 261. Second locking face 263' may include further locking stairsteps 265'. In some embodiments, locking body spring 267 may be positioned between squeezer assembly 181 and inner locking body 261. Locking body spring 267 may, in some embodiments, allow gripper assembly 111 and seal assembly 121 to operate at least partially independently.

Figure 17:
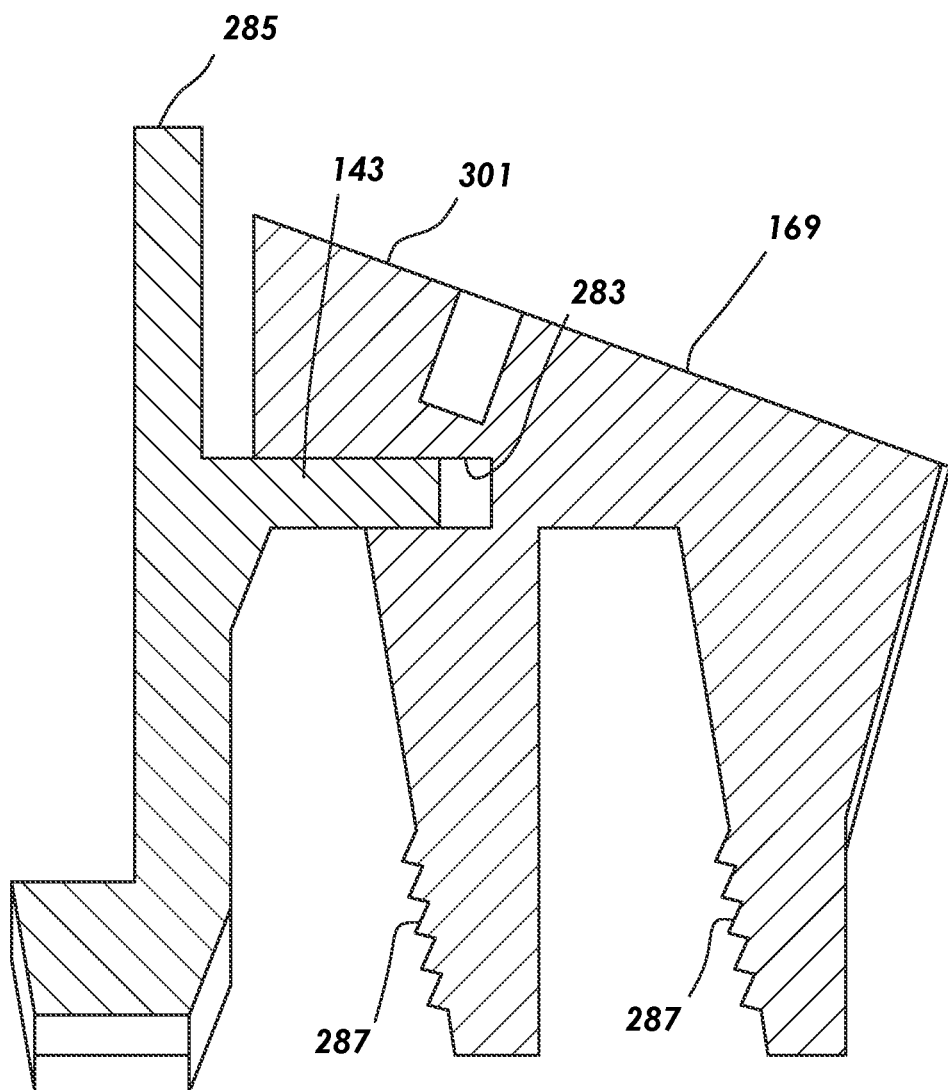
FIG. 17 depicts a partial cross section view of a seal expansion ring segment and gripper body consistent with at least one embodiment of the present disclosure.

In some embodiments, gripper bodies 281 may be positioned radially about inner locking body 261. In some embodiments, as shown in FIG. 17, each gripper body 281 may include expansion groove 283 positioned to receive a corresponding expansion boss 143 of a corresponding expansion ring segment 151. Expansion boss 143 may engage expansion groove 283 such that gripper body 281 and expansion ring segment 151 may move longitudinally relative to each other, while linking gripper body 281 and expansion ring segment 151 in radial movement. In some embodiments, expansion boss 143 and expansion groove 283 may operate such that gripper body 281 supports expansion ring segment 151 and therefore primary seal ring 161 in the radially expanded position when gripper body 281 is in the radially expanded position. In some embodiments, expansion spring 285 may be positioned between gripper body 281 and expansion ring segment 151. Expansion spring 285 may be positioned to bias gripper body 281 longitudinally away from expansion ring segment 151, which may, in some embodiments, delay engagement between gripper body 281 and inner locking body 261 during actuation of pipeline plug 100 as further described below.

In some embodiments, gripper bodies 281 may include gripper stairsteps 287 positioned to engage with locking stairsteps 265 (and, where included, locking stairsteps 265') when pipeline plug 100 is fully engaged to pipeline 10 as further described below.

In some embodiments, with reference to FIG. 5, sliding gripper 301 may abut gripper body 281 at radially outward face 269 of gripper body 281. In some embodiments, sliding gripper 301 may be wedge shaped. In some such embodiments, radially outward face 269 may be formed at an angle as shown in FIG. 5 or may be curved to correspond with the contour of sliding gripper 301. In such an embodiment, longitudinal movement of sliding gripper 301 relative to gripper body 281 may cause sliding gripper 301 to move radially outward from gripper body 281. Such longitudinal movement may, in some embodiments, be caused by longitudinal movement of gripper assembly 111 relative to a pipeline when in the set position as further described below. In some embodiments, sliding gripper 301 may be mechanically coupled to gripper body 281 by sliding gripper bolt 303.

Figure 18:
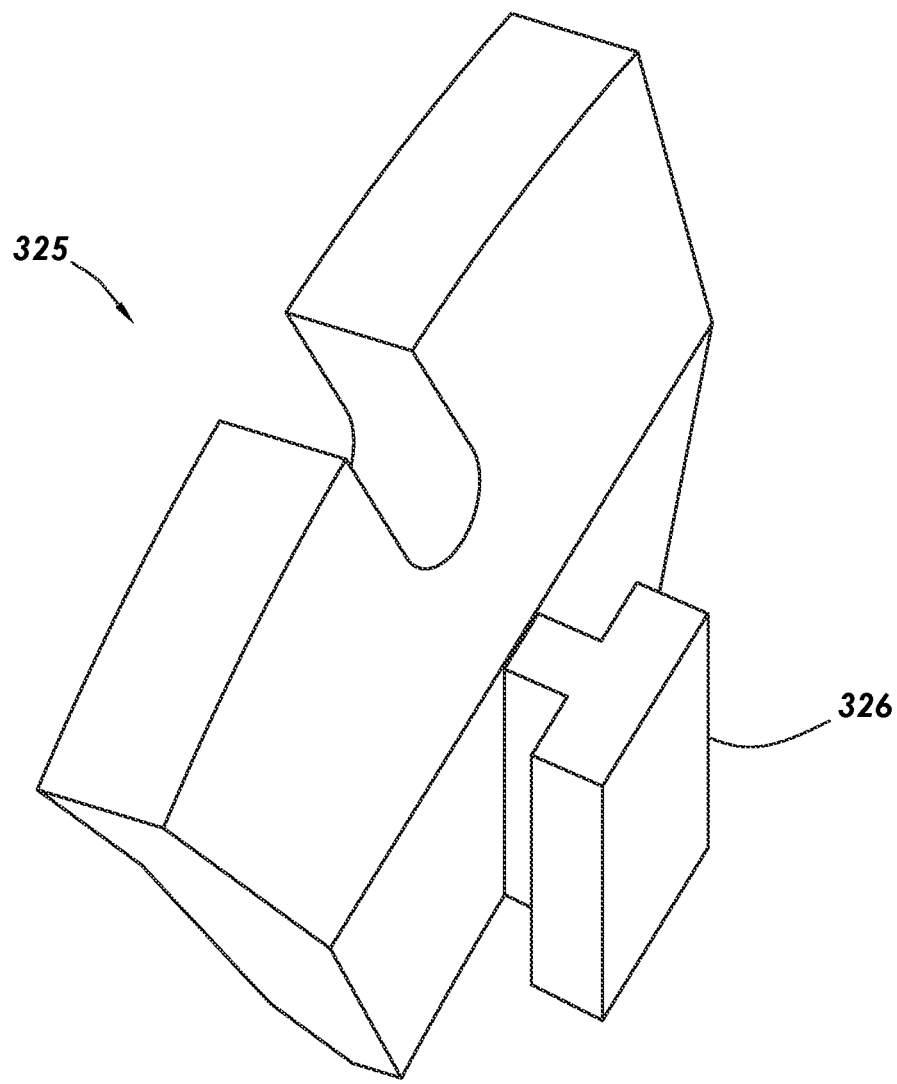
FIG. 18 depicts a perspective view of an actuator plate consistent with at least one embodiment of the present disclosure.

In some embodiments, actuator assembly 321 may include actuator body 323 and actuator plates 325. In some embodiments, actuator plates 325 may be mechanically coupled to actuator body 323 such that actuator plates 325 may slide substantially radially outward. In some embodiments, actuator plates 325 may couple to actuator body 323 by dovetail slots or using connectors such as a T-bolts engaging T-slots formed in actuator plates 325. For example, FIG. 18 shows actuator plate 325 formed with T-boss 326 positioned to engage with a corresponding slot formed in actuator body 323.

In some embodiments, with reference to FIG. 5, actuator body 323 may be formed with a taper angle such that actuator plates 325 extend along actuator body 323 at the taper angle relative to the radial direction. Actuator plate 325 may be biased radially outward as actuator body 323 is moved longitudinally toward pressure head 231 during actuation of pipeline plug 100 due to the taper angle of actuator body 323. The taper angle between actuator body 323 and actuator plate 325 and the taper angle between pressure head 231 and secondary tapered ring 201 may be selected such that the actuation of pipeline plug 100 as described below operates in accordance with a desired expansion profile. In some embodiments, the taper angle between actuator body 323 and actuator plate 325 may correspond with the taper angle between pressure head 231 and secondary tapered ring 201.

In some embodiments, each sliding gripper 301 may be mechanically coupled to a corresponding actuator plate 325. In some such embodiments, sliding gripper 301 may be mechanically coupled to actuator plate 325 by actuator fastener 327. In such an embodiment, as actuator body 323 is moved toward pressure head 231 and actuator plate 325 moves radially outward, sliding gripper 301 and, in turn, gripper body 281, expansion ring segment 151, and primary seal ring 161, are moved radially outward as well. In some embodiments, locking spring 329 may be positioned between actuator plate 325 and gripper body 281. Locking spring 329 may, for example and without limitation, maintain separation between actuator plate 325 and gripper body 281 such that sliding gripper 301 remains in a retracted position relative to gripper body 281 until sliding gripper 301 engages pipeline 10 as further described below. In some embodiments, actuator plate 325 may additionally cause sliding gripper 301 to move relative to gripper body 281 and into further engagement with pipeline 10.

Figure 5A:
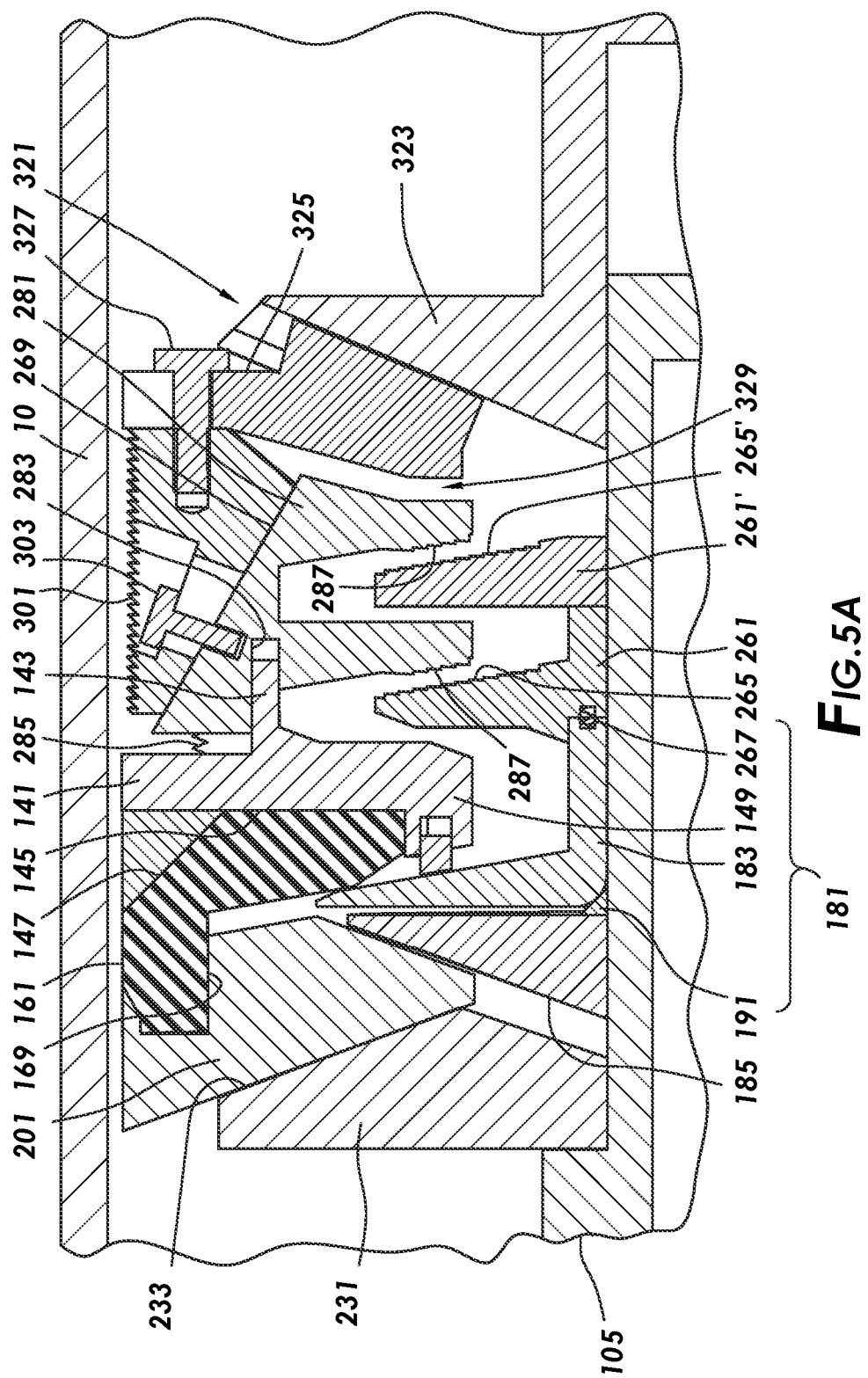
FIG. 5A depicts a detail cross section view of the pipeline plug of FIG. 5 in a partially actuated position.

FIGS. 5, 5A, and 6 depict a nonlimiting example of a plugging operation involving pipeline plug 100. Pipeline plug 100 is positioned at a desired location within pipeline 10 in the run-in configuration as shown in FIG. 5. Gripper assembly 111 and seal assembly 121 may be actuated using actuation mechanism 103.

Actuation mechanism 103 may be activated such that movable head 107 is moved longitudinally toward fixed head 105, such that actuator body 323 is moved toward pressure head 231. The differential compressive force applied between actuator body 323, coupled to fixed head 105, and pressure head 231, coupled to movable head 107, is applied to each abutting component of gripper assembly 111 and seal assembly 121, thereby generating a normal force between pressure head 231 and secondary tapered ring 201, secondary tapered ring 201 and squeezer assembly 181, squeezer assembly 181 and primary seal ring 161, primary seal ring 161 and seal expansion ring 141, seal expansion ring 141 and gripper body 281 (through, in some embodiments, expansion spring 285), gripper body 281 and actuator plate 325 (through, in some embodiments, locking spring 329), gripper body 281 and sliding gripper 301, sliding gripper 301 and actuator plate 325, and actuator plate 325 and actuator body 323.

Because secondary tapered ring 201 engages squeezer assembly 181 at small squeezer ring 185 and primary seal ring 161 engages squeezer assembly 181 and large squeezer ring 183, the compressive longitudinal force may cause small squeezer ring 185 and large squeezer ring 183 to pinch together, further compressing against inner seal 191. In some embodiments, seal expansion ring 141 and secondary tapered ring 201 may be reversed in position relative to squeezer assembly 181 without deviating from the scope of this disclosure.

As pressure head 231 and actuator body 323 compress gripper assembly 111 and seal assembly 121, secondary tapered ring 201, primary seal ring 161, seal expansion ring 141, gripper body 281, sliding gripper 301, and actuator plate 325 are biased radially outward. In some embodiments in which the taper angles of these interfaces are generally the same, the initial radial expansion of secondary tapered ring 201, primary seal ring 161, seal expansion ring 141, gripper body 281, sliding gripper 301, and actuator plate 325 may be in a substantially radial direction with respect to the rest of seal assembly 121. Such an arrangement may, for example and without limitation, allow seal assembly 121 to be used with pipelines 10 of varying internal diameters.

Such radial extension continues until gripper assembly 111 and seal assembly 121 contact pipeline 10 as shown in FIG. 5A. Continued longitudinal movement of actuator body 323 may cause seal assembly 121 to continue to move with movable head 107 while gripper assembly 111 is held in place due to the contact with pipeline 10. In such an embodiment, inner locking body 261 may continue to move with seal assembly 121 due to the abutment between inner locking body 261 and squeezer assembly 181 as discussed above. Seal assembly 121 may continue to move until inner locking body 261 contacts gripper body 281, as shown in FIG. 6. In such an embodiment, locking stairsteps 265 may engage with gripper stairsteps 287. The engagement of locking stairsteps 265 and gripper stairsteps 287 may, for example and without limitation, maintain gripper assembly 111 and seal assembly 121 in the extended position, without being bound to theory, thereby maintaining the engagement of sliding gripper 301 and pipeline 10. In some embodiments, where a differential fluid pressure is applied across pipeline plug 100, gripper assembly 111 and seal assembly 121 may be self-actuating.

Once sliding gripper 301 engages pipeline 10, sliding gripper 301 may be biased further into contact with pipeline 10 via longitudinal movement of pipeline plug 100 within pipeline 10 caused by, for example and without limitation, differential pressure across pipeline plug 100. In some embodiments, the outward force exerted on pipeline 10 by sliding gripper 301 may be exerted on gripper body 281 such that gripper stairsteps 287 fully engage locking stairsteps 265, thereby transferring the radial forces to inner locking body 261. Due to the configuration of gripper stairsteps 287 and locking stairsteps 265, the ability of gripper body 281 to move radially inward may be impeded.

In some embodiments, in order to retract gripper assembly 111 and seal assembly 121, such differential fluid pressure may be equalized, and actuation mechanism 103 may be operated to move fixed head 105 and movable head 107 longitudinally apart, thereby allowing locking stairsteps 265 and gripper stairsteps 287 to disengage. As primary seal ring 161 is formed from an elastomeric material elastically deformed radially outward during the actuation operation, primary seal ring 161 exerts a radially inward force on seal expansion ring 141 via seal lip 149 and on secondary tapered ring 201 via return pocket 205 through return flange 169. Such inward radial force may force gripper assembly 111 and seal assembly 121 to return to the initial run-in position.

In some embodiments, pipeline plug 100 may be positioned within pipeline 10 non-intrusively or inline, such that pipeline plug 100 is run through pipeline 10 until in a desired position within pipeline 10, at which time pipeline plug 100 is actuated as described above.

Figure 19:
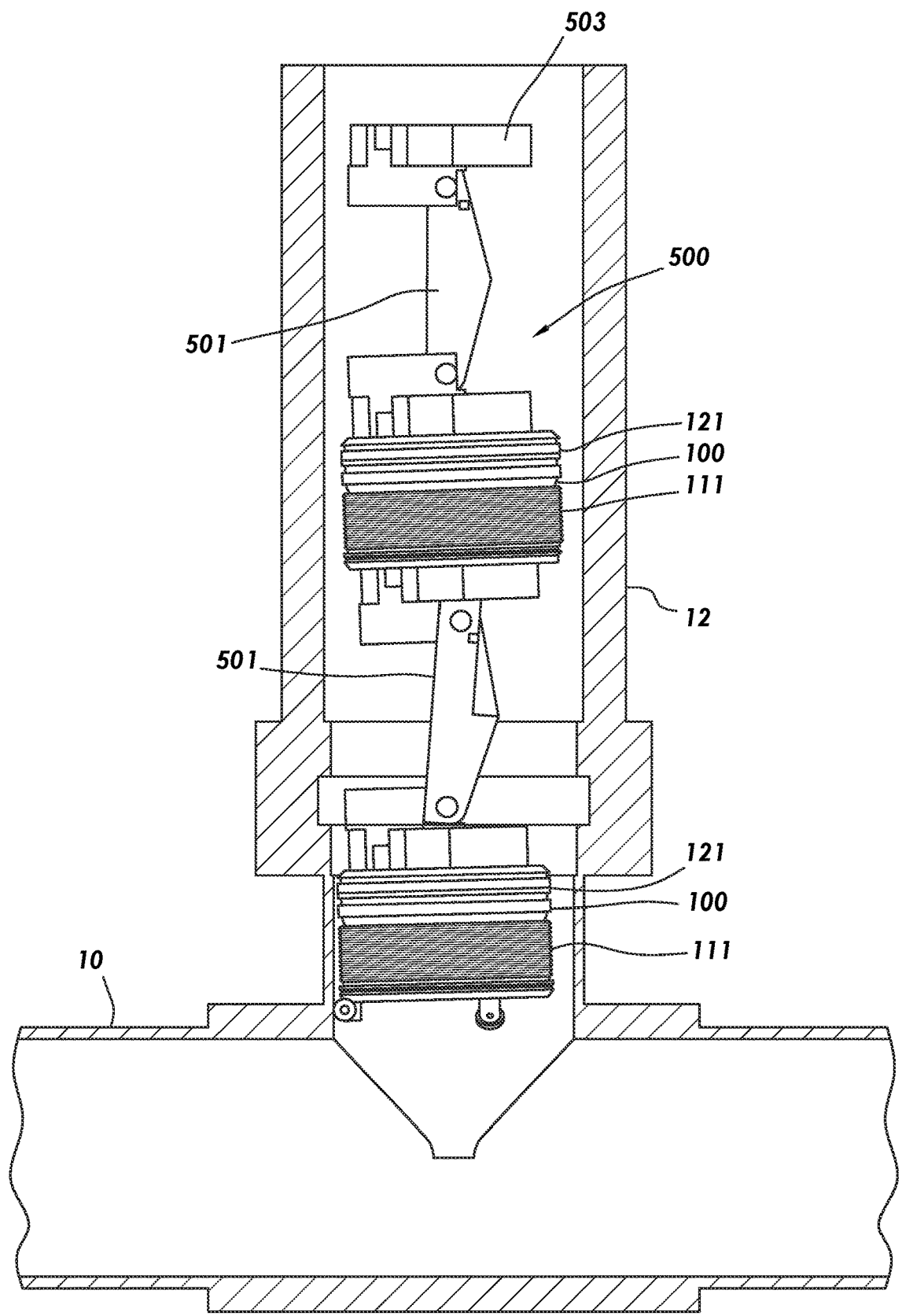

In other embodiments, such as shown in FIGS. 19-22, pipeline plug assembly 500 may be positioned within pipeline 10 in an intrusive intervention operation. For example, during a hot tapping and plugging operation, tap connection 12 is affixed to pipeline 10, and a hole is formed in pipeline 10 to connect the interior of tap connection 12 to the bore of pipeline 10. Pipeline plug assembly 500 may include one or more pipeline plugs 100 as discussed above, each including gripper assembly 111 and seal assembly 121. For example, FIGS. 19 and 20 depict pipeline plug assembly 500 including two pipeline plugs 100, while FIG. 21 depicts pipeline plug assembly 500', which includes three pipeline plugs 100. Additionally, in some embodiments, as shown in FIG. 22, additional tools may be included with pipeline plug assembly 500" including, for example and without limitation, pigging module 511.

Pipeline plug assembly 500 may initially be positioned within tap connection 12 as shown in FIG. 19, and may then be introduced into pipeline 10 as shown in FIGS. 20-22, at which point pipeline plugs 100 may be actuated to grip pipeline 10 and fluidly seal against pipeline 10. In some embodiments, pipeline plug assembly 500 may include running tool 503, positioned to allow pipeline plug assembly 500 to be inserted into pipeline 10. In some embodiments, once pipeline plug assembly 500 is positioned within pipeline 10, running tool 503 may be removed, as each pipeline plug 100 includes gripper assembly 111 positioned to retain pipeline plug assembly 500 at the desired location in pipeline 10. In some embodiments, tap connection 12 may be removed and pipeline 10 may be sealed once pipeline plug assembly 500 is positioned within pipeline 10. Later removal of pipeline plug assembly 500 may be accomplished by inline methods.

In some embodiments, pipeline plugs 100 may be mechanically coupled to each other via pivot links 501. Pivot links 501 may allow for articulation between pipeline plugs 100 and any other equipment included with pipeline plug assembly 500 to allow pipeline plug assembly 500 to be positioned into pipeline 10. In some embodiments, pivot links 501 may be adapted to pivot only in one direction, therefore allowing pipeline plugs 100 to enter into pipeline 10 from tap connection 12 in one direction. In some embodiments, pipeline plug assembly 500 may include rollers 505 positioned to assist with the insertion of pipeline plug assembly 500 into pipeline 10.

In some embodiments, as shown in FIG. 21, one or more of pipeline plugs 100 may be oriented in a direction opposite at least one other pipeline plug 100 of pipeline plug assembly 500'. In such an embodiment, pipeline plug assembly 500' may provide for fluid isolation in both directions relative to pipeline 10, thereby, for example and without limitation, allowing pressure testing of pipeline 10.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A pipeline plug comprising:
    a pressure head;
    a seal expansion ring;
    a seal assembly, the seal assembly including:
        a secondary tapered ring, the secondary tapered ring abutting the pressure head at a tapered wedge face of the pressure head;
        a squeezer assembly, the squeezer assembly abutting the second tapered ring at a wedge squeezer face of the secondary tapered ring; and
        a primary seal ring, the primary seal ring positioned between the secondary tapered ring, the squeezer assembly, and the seal expansion ring;
    a plurality of gripper bodies, each gripper body coupled to the seal expansion ring;
    a sliding gripper slidingly coupled to a radially outer surface of the gripper body; and
    an actuator.

2. The seal assembly of claim 1, further comprising an inner locking body positioned radially within the gripper bodies.

3. The seal assembly of claim 2, wherein the gripper body further comprises gripper stairsteps, the gripper stairsteps positioned to engage with locking stairsteps formed on a locking face of the inner locking body when the gripper body is in an extended and locked position.

4. The seal assembly of claim 2, further comprising a second inner locking body, the second inner locking body abutting the inner locking body.

5. The seal assembly of claim 2, wherein the squeezer assembly abuts the inner locking body.

6. The seal assembly of claim 5, wherein the squeezer assembly abuts the inner locking body via a locking body spring.

7. The seal assembly of claim 1, wherein the primary seal ring is formed from an elastomeric material.

8. The seal assembly of claim 1, wherein the squeezer assembly further includes an inner seal.

9. The seal assembly of claim 8, wherein the squeezer assembly comprises a large squeezer ring and a small squeezer ring, wherein the inner seal is positioned between the large squeezer ring and the small squeezer ring.

10. The seal assembly of claim 1, wherein the secondary tapered ring comprises a plurality of wedge segments.

11. The seal assembly of claim 10, wherein each wedge segment includes a wedge rabbet, each wedge rabbet configured to slidingly engage a second wedge rabbet of an adjacent wedge segment.

12. The seal assembly of claim 1, wherein the primary tapered ring includes a seal lip, the seal lip defining a seal pocket, wherein the primary seal ring is positioned at least partially within the seal pocket.

13. The seal assembly of claim 1, wherein the primary seal ring further comprises a return flange.

14. The seal assembly of claim 13, wherein the secondary tapered ring includes a return pocket, the return flange of the primary seal ring positioned at least partially within the return pocket.

* * * * *